US012627052B2

(12) United States Patent
Wang et al.

(10) Patent No.: US 12,627,052 B2
(45) Date of Patent: May 12, 2026

(54) ANTENNA APPARATUS AND COMMUNICATION METHOD

(71) Applicant: HUAWEI TECHNOLOGIES CO., LTD., Shenzhen (CN)

(72) Inventors: Stephen Wang, Shenzhen (CN); Yongjun Liu, Beijing (CN); Liang Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 327 days.

(21) Appl. No.: 18/238,032

(22) Filed: Aug. 25, 2023

(65) Prior Publication Data

US 2023/0403047 A1     Dec. 14, 2023

Related U.S. Application Data

(63) Continuation of application No. PCT/CN2021/078120, filed on Feb. 26, 2021.

(51) Int. Cl.
*H04B 5/00* (2024.01)
*H01Q 7/00* (2006.01)
(Continued)

(52) U.S. Cl.
CPC ................ *H01Q 7/00* (2013.01); *H04B 5/22* (2024.01); *H04B 5/266* (2024.01); *H04B 5/43* (2024.01); *H04W 52/38* (2013.01)

(58) Field of Classification Search
CPC ......... H04W 52/38; H01Q 7/00; H04B 5/266; H04B 5/43; H04B 5/22; H04B 5/00; H04B 5/26; H04B 5/0031
See application file for complete search history.

(56) References Cited

U.S. PATENT DOCUMENTS

| | | | | |
|---|---|---|---|---|
| 9,997,828 B2 * | 6/2018 | Ouyang | ................ | H01Q 3/247 |
| 10,320,086 B2 * | 6/2019 | Kerselaers | ............. | H01Q 1/273 |

(Continued)

FOREIGN PATENT DOCUMENTS

| | | |
|---|---|---|
| CN | 106486778 A | 3/2017 |
| CN | 206961164 U | 2/2018 |

(Continued)

*Primary Examiner* — Tuan H Nguyen
(74) *Attorney, Agent, or Firm* — WOMBLE BOND DICKINSON (US) LLP

(57) ABSTRACT

This application provides an antenna apparatus and a communication method. The antenna apparatus includes a processing module and a plurality of transmission links. The processing module is configured to generate a to-be-transmitted signal, and transmit the to-be-transmitted signal to the plurality of transmission links. The plurality of transmission links are configured to transmit the to-be-transmitted signal. The plurality of transmission links include at least one electric near field transmission link and at least one magnetic near field transmission link. The electric near field transmission link includes an electric near field front end and an electric near field antenna. The electric near field front end is configured to transmit the to-be-transmitted signal to the electric near field antenna. The magnetic near field transmission link includes a magnetic near field front end and a magnetic near field antenna.

20 Claims, 14 Drawing Sheets

(51) Int. Cl.

| | | |
|---|---|---|
| *H04B 5/22* | (2024.01) | |
| *H04B 5/26* | (2024.01) | |
| *H04B 5/43* | (2024.01) | |
| *H04W 52/38* | (2009.01) | |

(56) References Cited

U.S. PATENT DOCUMENTS

| | | |
|---|---|---|
| 10,326,204 B2 | 6/2019 | Pallas et al. |
| 10,566,690 B1 | 2/2020 | Kerselaers |
| 2007/0222609 A1 | 9/2007 | Duron et al. |
| 2015/0318896 A1 | 11/2015 | Kerselaers et al. |
| 2020/0244315 A1 | 7/2020 | Kerselaers |

FOREIGN PATENT DOCUMENTS

| | | |
|---|---|---|
| CN | 108321491 B | 12/2019 |
| CN | 110247158 B | 6/2021 |
| CN | 110867640 B | 5/2022 |

* cited by examiner (a)                    (b)                    (c)

(a)          (b)          (c)

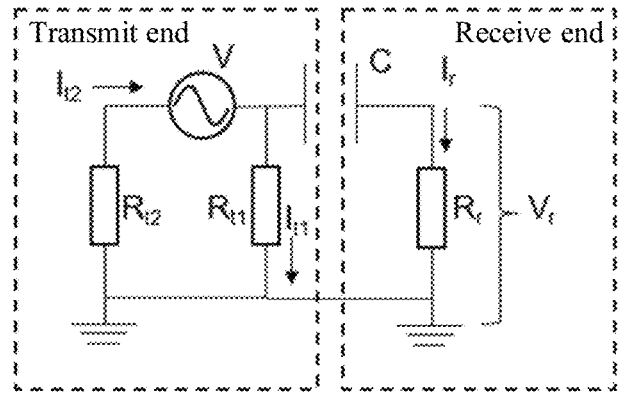
FIG. 17
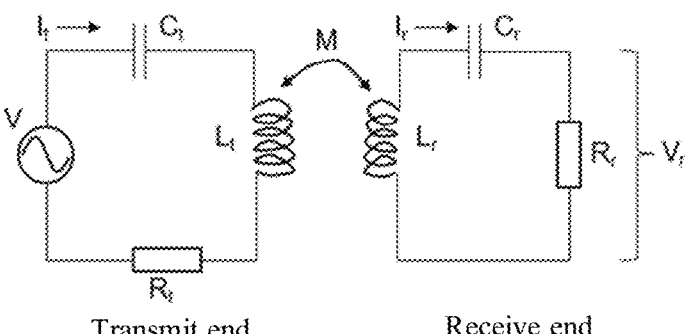
FIG. 18
| 1901. Generate a to-be-transmitted signal, and transmit the to-be-transmitted signal to a plurality of transmission links |
| --- |
| 1902. The plurality of transmission links transmit the to-be-transmitted signal |
| --- |
FIG. 19

2001. A plurality of transmission links receive a signal or energy

2002. Process the received signal or energy

ANTENNA APPARATUS AND COMMUNICATION METHOD

CROSS-REFERENCE TO RELATED APPLICATIONS

This application is a continuation of International Application No. PCT/CN2021/078120, filed on Feb. 26, 2021, the disclosure of which is hereby incorporated by reference in its entirety.

TECHNICAL FIELD

This application relates to the field of wireless communications, and in particular, to an antenna apparatus and a communication method.

BACKGROUND

In a modem communications system, an electromagnetic field has become an important signal carrier. The electromagnetic field not only allows signals to propagate on devices, but also allows signals to propagate in space. The latter should be attributed to a characteristic that the electromagnetic field does not depend on any medium for propagation. This characteristic creates a prerequisite for emergence of wireless communication. Usually, an antenna apparatus is used in wireless communication to implement electromagnetic field transmission and reception. Common wireless communication based on the antenna apparatus may be classified into near field communication and far field communication depending on transmission distances.

Actually, there is no strict boundary between a range of near field communication and a range of far field communication. However, within a typical near field range or far field range, the electromagnetic field has an obvious near field feature or far field feature. Therefore, in an antenna design process, these features can be fully considered, and even a dedicated matching circuit can be designed. For example, for near field communication, a principle of electric field coupling or magnetic field coupling is preferentially used for designing, but for far field communication, a principle of electromagnetic radiation is used for designing.

In the conventional technology, near field communication (NFC) has been applied to a mobile phone, and is a very short range communication or a wireless charging function implemented by using a coil antenna. However, its signal or energy transmission efficiency is relatively low. Far field communication related to Bluetooth, Wi-Fi, or the like mainly uses an electromagnetic wave radiated in a far field for communication. However, within a near field range of a far field radiation technology, energy transmission efficiency in communication is relatively low because a large radiation loss is caused in a process of radiating the electromagnetic wave. In other words, an antenna apparatus supporting far field communication is not applicable to a near field communication scenario. Therefore, the foregoing problem of relatively low transmission efficiency in near field communication cannot be resolved, and overall signal or energy transmission efficiency is relatively low.

Therefore, how to improve signal or energy transmission efficiency is an urgent technical problem to be resolved.

SUMMARY

This application provides an antenna apparatus and a communication method to effectively improve signal or energy transmission efficiency.

According to a first aspect, an antenna apparatus is provided. The apparatus includes a processing module and a plurality of transmission links. The processing module is configured to generate a to-be-transmitted signal, and transmit the to-be-transmitted signal to the plurality of transmission links. The plurality of transmission links are configured to transmit the to-be-transmitted signal. The plurality of transmission links include at least one electric near field transmission link and at least one magnetic near field transmission link. The electric near field transmission link includes an electric near field front end and an electric near field antenna. The electric near field front end is configured to transmit the to-be-transmitted signal to the electric near field antenna. The magnetic near field transmission link includes a magnetic near field front end and a magnetic near field antenna. The magnetic near field front end is configured to transmit the to-be-transmitted signal to the magnetic near field antenna. The electric near field antenna and the magnetic near field antenna are configured to transmit the to-be-transmitted signal.

In the technical solution of this application, the signal can be simultaneously transmitted from the electric near field transmission link and the magnetic near field transmission link, so that transmission efficiency in near field communication can be effectively improved.

It should be noted that the antenna apparatus in the first aspect corresponds to an antenna apparatus at a transmit end, and that an antenna apparatus in a second aspect corresponds to an antenna apparatus at a receive end.

In an embodiment, the plurality of transmission links are configured to simultaneously transmit the to-be-transmitted signal at a same transmit frequency.

In an embodiment, the processing module is further configured to allocate transmit power of the to-be-transmitted signal on the plurality of transmission links.

In an embodiment, the processing module is further configured to adjust the transmit power, so that when an antenna apparatus at a receive end receives the to-be-transmitted signal, a difference of received power on a plurality of transmission links of the antenna apparatus at the receive end is within a preset range. In other words, the transmit power of the transmit end is adjusted, so that the difference of the received power on the transmission links of the receive end is relatively small.

This is equivalent to enabling each transmission link to be maximized, so that overall transmission efficiency is improved as much as possible.

The received power may be fed back by the antenna apparatus at the receive end, or may be obtained by measuring a local current.

In an embodiment, the received power is obtained based on currents on the plurality of transmission links at the transmit end; or the received power is fed back by the antenna apparatus at the receive end to the transmit end. In the former case, the transmit end measures the current of the transmit end to calculate the received power of the receive end, and information exchange between the transmit end and the receive end is not required. In the latter case, the receive end notifies the transmit end of the received power, and information exchange is required.

Because the transmit end may not know load resistance of the receive end at the beginning, the transmit end cannot know the received power by measuring the current. Therefore, in an embodiment, the receive end may alternatively feed back received energy at the beginning, and the transmit end subsequently determines the received power by directly measuring the local current. In another embodiment, load resistance of the receive end is a standard fixed value. Therefore, the transmit end can determine the received power by directly measuring the local current at the beginning.

In an embodiment, the electric near field front end includes a voltage amplifier, and the voltage amplifier is configured to increase a transmit voltage of the to-be-transmitted signal. Increasing the transmit voltage of the to-be-transmitted signal may be understood as increasing a transmit voltage of the electric near field antenna to increase the transmit voltage of the to-be-transmitted signal; alternatively, it may be understood that the electric near field antenna uses an increased voltage to transmit the signal. The transmit end uses a voltage amplifier and does not use a power amplifier. In this case, a function of the voltage amplifier is to increase the voltage, so that a transmission range can be expanded, instead of feeding power to a tuned antenna. Therefore, when other conditions are the same, power consumption of the electric near field antenna is lower than power consumption of a near field antenna in the conventional technology, power consumption of the voltage amplifier is lower than power consumption of a power amplifier in the conventional technology, and near field transmission efficiency of the voltage amplifier is higher than transmission efficiency of the power amplifier in the conventional technology. Therefore, power consumption in electric near field communication in this embodiment of this application is lower than power consumption in short range communication using an electromagnetic radiation technology in the conventional technology, but transmission efficiency is higher than transmission efficiency of short range communication using the electromagnetic radiation technology. In addition, in the conventional technology, near field communication is performed by using the electromagnetic field radiation technology, instead of a manner of separating an electric near field and a magnetic near field in this application, and a signal can be transmitted only from one of an electric field and a magnetic field and cannot be transmitted from the electric near field and the magnetic near field simultaneously. In near field communication in this embodiment of this application, a signal can be transmitted from the electric near field and the magnetic near field simultaneously. Therefore, a capacity is larger, and signal or energy transmission efficiency is effectively improved.

It should be noted that near field communication and far field communication are relative concepts, and that short range communication and long range communication are relative concepts. For example, in short range communication, both near field communication and far field communication may be used. Near field communication and far field communication are classified based on wavelengths, and there is no strict demarcation between near field communication and far field communication. Short range communication and long range communication are simply classified based on a distance between a transmit end and a receive end, without involving wavelengths. The electromagnetic radiation technology is a technology without regard for near field communication or far field communication, and a limitation of the technology determines that the electromagnetic radiation technology is used only for short range communication.

In an embodiment, the antenna apparatus further includes a far field transmission link, the far field transmission link includes a far field front end and a far field antenna, the far field front end is configured to transmit the to-be-transmitted signal to the far field antenna, and the far field antenna is configured to transmit the to-be-transmitted signal.

In an embodiment, any plurality of antennas of the electric near field antenna, the magnetic near field antenna, and the far field antenna are integrated. In this embodiment of this application, the magnetic near field antenna, the electric near field antenna, and the far field antenna may be integrated, or may be respectively implemented by using separate antennas. When separate antennas are used, because signals of antennas of different types are independent of each other, that is, there is little mutual interference, a spacing between the antennas does not need to be very large. To be specific, the spacing between the antennas of different types may be less than ½ of a wavelength or even less than 1/10 of a wavelength, while signal independence can still be maintained. This is different from a spatial multiplexing or diversity technology in which an antenna spacing greater than ½ of a wavelength is needed to achieve signal independence and implement parallel transmission of multiple signals. If an integrated antenna is used, an antenna structure can be more compact, thereby reducing a volume of an antenna module.

It should be noted that in this embodiment of this application, an antenna structure based on a liquid radio frequency material and technology may alternatively be used for the antenna to achieve a low-frequency ultra-wideband transmission effect.

In an embodiment, the processing module is further configured to generate to-be-transmitted energy, and transmit the to-be-transmitted energy to the plurality of transmission links; the plurality of transmission links are further configured to transmit the to-be-transmitted energy; and the processing module is further configured to adjust energy allocation of the to-be-transmitted energy on the plurality of transmission links based on a status of receiving the to-be-transmitted energy by the antenna apparatus at the receive end. In other words, the antenna apparatus in the first aspect can be configured to transmit both a signal and energy, and when the antenna apparatus is configured to transmit energy, energy allocation may also be adjusted to improve energy transmission efficiency.

According to a second aspect, an antenna apparatus is provided. The apparatus includes a plurality of transmission links and a processing module. The plurality of transmission links are configured to receive a signal or energy. The plurality of transmission links include at least one electric near field transmission link and at least one magnetic near field transmission link. The electric near field transmission link includes an electric near field front end and an electric near field antenna. The magnetic near field transmission link includes a magnetic near field front end and a magnetic near field antenna. The electric near field antenna and the magnetic near field antenna are configured to receive the signal or the energy. The electric near field front end is configured to transmit the signal or the energy received by the electric near field antenna to the processing module. The magnetic near field front end is configured to transmit the signal or the energy received by the magnetic near field antenna to the processing module. The processing module is configured to process the signal or the energy.

In the technical solution of this application, the signal can be simultaneously received from the electric near field transmission link and the magnetic near field transmission link, so that transmission efficiency in near field communication can be effectively improved.

It should be noted that the antenna apparatus in the first aspect corresponds to the antenna apparatus at the transmit end, and that the antenna apparatus in the second aspect corresponds to the antenna apparatus at the receive end.

Therefore, for improvements of the antenna and the transmission links in the second aspect, refer to the first aspect. For example, an integrated antenna may be used, or a far field transmission link may be included. However, the processing modules are different. The processing module of the antenna apparatus at the transmit end is configured to generate a signal, and the processing module of the antenna apparatus at the receive end is configured to process a received signal.

In an embodiment, the processing module is further configured to feed back, to the antenna apparatus at the transmit end, received power of the signal received on the plurality of transmission links, and/or configured to feed back, to the antenna apparatus at the transmit end, a status of receiving the energy on the plurality of transmission links. Due to the feedback of the received power of the signal and/or the status of receiving the energy, the transmit end can properly adjust allocation of the transmit power or the transmitted energy based on the receiving status. This enables each transmission link to be maximized, so that overall transmission efficiency is improved as much as possible.

In an embodiment, the antenna apparatus may further include a far field transmission link, the far field transmission link includes a far field front end and a far field antenna, the far field antenna is configured to receive the signal or the energy, and the far field front end is configured to transmit the signal or the energy received by the far field antenna to the processing module.

In an embodiment, any plurality of antennas of the electric near field antenna, the magnetic near field antenna, and the far field antenna may be integrated.

According to a third aspect, a communication method is provided. The method includes: generating a to-be-transmitted signal, and transmitting the to-be-transmitted signal to a plurality of transmission links; and transmitting, by the plurality of transmission links, the to-be-transmitted signal. The plurality of transmission links include at least one electric near field transmission link and at least one magnetic near field transmission link. The electric near field transmission link includes an electric near field front end and an electric near field antenna. The electric near field front end is configured to transmit the to-be-transmitted signal to the electric near field antenna. The magnetic near field transmission link includes a magnetic near field front end and a magnetic near field antenna. The magnetic near field front end is configured to transmit the to-be-transmitted signal to the magnetic near field antenna. The electric near field antenna and the magnetic near field antenna are configured to transmit the to-be-transmitted signal.

The antenna apparatus in the first aspect may be used to perform the method in any embodiment of the third aspect.

In an embodiment, the plurality of transmission links may simultaneously transmit the to-be-transmitted signal at a same transmit frequency.

In an embodiment, when the to-be-transmitted signal is transmitted to the plurality of transmission links, transmit power of the to-be-transmitted signal on the plurality of transmission links may be allocated.

In an embodiment, the communication method may further include: adjusting the transmit power, so that when an antenna apparatus at a receive end receives the to-be-transmitted signal, a difference of received power on a plurality of transmission links of the antenna apparatus at the receive end is within a preset range.

In an embodiment, the received power is obtained based on currents on the plurality of transmission links at a transmit end; or the received power is fed back by the antenna apparatus at the receive end to the transmit end.

In an embodiment, the communication method may further include: generating to-be-transmitted energy, and transmitting the to-be-transmitted energy to the plurality of transmission links; transmitting, by the plurality of transmission links, the to-be-transmitted energy; and adjusting energy allocation of the to-be-transmitted energy of the antenna apparatus at the transmit end on the plurality of transmission links based on a status of receiving the to-be-transmitted energy by the antenna apparatus at the receive end.

According to a fourth aspect, a communication method is provided. The method includes: receiving, by a plurality of transmission links, a signal or energy, and then processing the received signal or energy. The plurality of transmission links include at least one electric near field transmission link and at least one magnetic near field transmission link. The electric near field transmission link includes an electric near field front end and an electric near field antenna. The magnetic near field transmission link includes a magnetic near field front end and a magnetic near field antenna. The electric near field antenna and the magnetic near field antenna are configured to receive the signal or the energy. The electric near field front end is configured to transmit the signal or the energy received by the electric near field antenna to a processing module. The magnetic near field front end is configured to transmit the signal or the energy received by the magnetic near field antenna to the processing module.

The antenna apparatus in the second aspect may be used to perform the method in any embodiment of the fourth aspect.

In an embodiment, the communication method further includes: feeding back, to an antenna apparatus at a transmit end, received power of the signal received on the plurality of transmission links, and/or feeding back, to the antenna apparatus at the transmit end, a status of receiving the energy on the plurality of transmission links.

According to a fifth aspect, a chip is provided. The chip includes a processor and a data interface. The processor reads, by using the data interface, instructions stored in a memory, to perform the method in any embodiment of the third aspect or the fourth aspect.

In an embodiment, the chip may further include a memory, the memory stores instructions, the processor is configured to execute the instructions stored in the memory, and when the instructions are executed, the processor is configured to perform the method in any embodiment of the third aspect or the fourth aspect.

According to a sixth aspect, a computer-readable medium is provided. The computer-readable medium stores program code for execution by a device, and the program code is used to perform the method in any embodiment of the third aspect or the fourth aspect.

According to a seventh aspect, a computer program product including instructions is provided. When the computer program product runs on a computer, the computer is enabled to perform the method in any embodiment of the third aspect or the fourth aspect.

According to an eighth aspect, this application provides an antenna system. The antenna system includes at least one antenna apparatus at a transmit end and at least one antenna apparatus at a receive end, where the antenna apparatus at the transmit end is the antenna apparatus in any embodiment of the first aspect, and the antenna apparatus at the receive end is the antenna apparatus in any embodiment of the second aspect.

BRIEF DESCRIPTION OF DRAWINGS

FIG. 17 is a schematic diagram of a circuit model for electric near field communication according to an embodiment of this application;

FIG. 18 is a schematic diagram of a circuit model for magnetic near field communication according to an embodiment of this application;

FIG. 19 is a schematic flowchart of a communication method according to an embodiment of this application.

DETAILED DESCRIPTION OF EMBODIMENTS

The following describes the technical solutions in this application with reference to the accompanying drawings.

Figure 1:
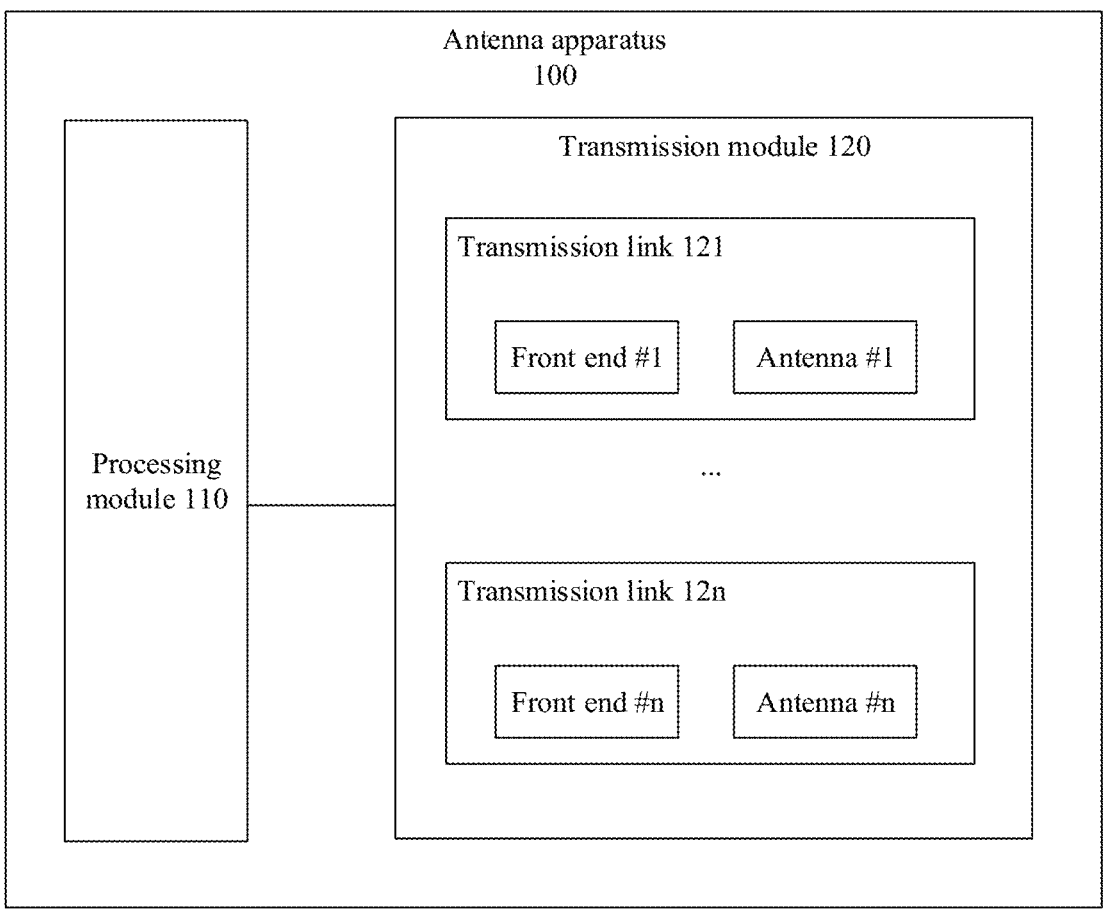
FIG. 1 is a schematic diagram of a structure of an antenna apparatus according to an embodiment of this application.

FIG. 1 is a schematic diagram of a structure of an antenna apparatus according to an embodiment of this application. The antenna apparatus can transmit a signal or energy radiated in an electric near field and a magnetic near field. In other words, the antenna apparatus may be configured to transmit a signal (that is, the antenna apparatus has a communication function), and may also be configured to transmit energy (that is, the antenna apparatus has a charging function).

In some embodiments, the antenna apparatus shown in FIG. 1 may further transmit a signal or energy radiated in a far field.

As shown in FIG. 1, the antenna apparatus 100 includes a processing module 110 and a transmission module 120.

When the antenna apparatus 100 is configured to transmit a signal or energy, the processing module 110 is configured to generate a to-be-transmitted signal or energy, and may be further configured to perform some processing on the to-be-transmitted signal, for example, some or all processing operations such as encoding, modulation, and scrambling. In other words, unified processing of a baseband signal, for example, operations such as channel encoding, modulation, and scrambling, may be included. The process may be performed by using the processing module 110.

In some embodiments, the processing module 110 may be further configured to allocate transmit power.

In some other embodiments, the processing module 110 may be further configured to adjust transmit power based on a receiving status of a receive end. The receiving status of the receive end may be received power fed back by the receive end, or may be obtained through calculation based on a current measured locally at a transmit end.

When the antenna apparatus 100 is configured to receive a signal or energy, the processing module 110 may be configured to process the received signal or energy, for example, may combine signals or energy of a plurality of links.

In other words, in a reception process, unified processing of a baseband signal, for example, operations such as channel decoding, demodulation, and descrambling, may also be generally included. The process may be performed by using the processing module 110.

The transmission module 120 includes a plurality of transmission links, for example, a transmission link 121 to a transmission link 12n shown in FIG. 1, where n is a positive integer greater than 1, and each transmission link includes a front end and an antenna. For example, the transmission link 121 includes a front end #1 and an antenna #1, and the transmission link 12n includes a front end #n and an antenna #n. The front end may be understood as a matching circuit of the antenna, and may be considered as a connection between the processing module 110 and the antenna, and configured to transmit a signal or energy from the processing module 110 to the antenna, to radiate the signal or energy from the antenna, or configured to transmit a signal or energy received by the antenna to the processing module 110. Generally, the front end processes an analog signal, and may further perform filtering, digital-to-analog conversion, analog-to-digital conversion, and the like.

In some embodiments, the plurality of transmission links include at least one electric near field transmission link and at least one magnetic near field transmission link. The electric near field transmission link may use an electric near field to transmit a signal or energy, and the magnetic near field transmission link may use a magnetic near field to transmit a signal or energy. In an example, it may be assumed that the transmission link 121 in FIG. 1 is an electric near field transmission link and that the transmission link 12n is a magnetic near field transmission link. In this case, the front end #1 is an electric near field front end, the front end #n is a magnetic near field front end, the antenna #1 is an electric near field antenna, and the antenna #n is a magnetic near field antenna. When the antenna apparatus 100 is configured to receive a signal or energy, the antenna #1 may alternatively be an electrode.

In some other embodiments, the plurality of transmission links may further include a far field transmission link. The far field transmission link includes a far field front end and a far field antenna, and is configured to transmit or receive a signal or energy in a far field.

It should be noted that in this embodiment of this application, some antennas in the antenna apparatus may alternatively be electrodes. Both an antenna and an electrode may be configured to transmit or receive a signal or energy, but their usage is slightly different. One end of the antenna needs to be grounded, and another end of the antenna transmits a signal, but the electrode does not need to be grounded. Both the antenna and the electrode are applicable to the antenna apparatus in this application.

The antennas in this embodiment of this application may be classified into an electric near field antenna, a magnetic near field antenna, and a far field antenna based on different application scenarios.

Optionally, the antennas in this embodiment of this application may include an electric near field antenna and a magnetic near field antenna, and may further include a far field antenna in some cases. The following describes several antennas with reference to FIG. 2.

Figure 2:
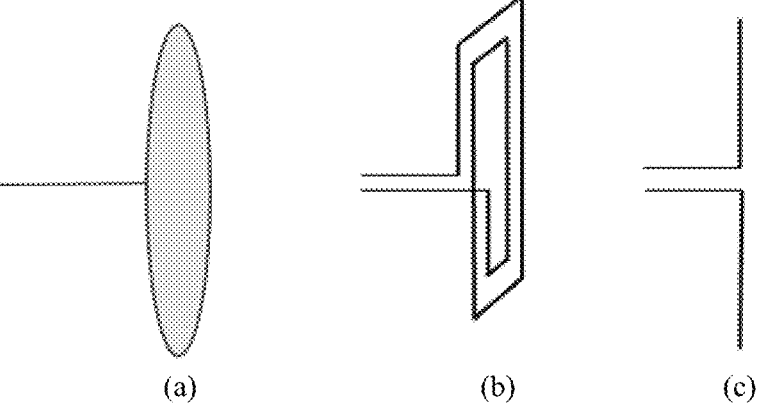
FIG. 2 is a schematic diagram of several antennas.

FIG. 2 is a schematic diagram of several antennas. As shown in FIG. 2, (a) in FIG. 2 is an example of an electric near field antenna. The electric near field antenna is an antenna having a specific area, and an electric near field antenna at a receive end may alternatively be an electrode having a specific area. Given a same transmit end, a quantity of electric near field signals or an amount of electric near field energy received by the receive end is in a linear relationship with an area of an antenna that is directly opposite to the transmit end. In other words, if the area is larger, more electric near field signals or energy is received.

(b) in FIG. 2 is an example of a magnetic near field antenna. The magnetic near field antenna may be a loop antenna or a coil, and an area enclosed by the magnetic near field antenna is relatively large. A capability of transmitting and receiving magnetic signals is determined by a magnetic flux that passes through a coil. However, because the magnetic near field antenna is of a relatively fine linear structure, an area of the magnetic near field antenna is relatively small.

(c) in FIG. 2 is an example of a far field antenna. The far field antenna is made of a relatively slim antenna and has a relatively small area. The far field antenna is an open antenna. In other words, there is no path from one connection port to another connection port along the antenna.

As can be learned by analyzing the structures of the electric near field antenna, the magnetic near field antenna, and the far field antenna, the electric near field antenna has a relatively large area and has a relatively high capability of receiving an electric near field signal, but has a relatively low capability of receiving a magnetic near field signal and a far field signal; the magnetic near field antenna has a relatively high capability of receiving a magnetic near field signal, but has a relatively low capability of receiving an electric near field signal and a far field signal; and the far field antenna has a relatively low capability of receiving an electric near field signal and a magnetic near field signal. Analysis of possible interference between the three antennas is described later, and is not described in detail herein.

Figure 3:
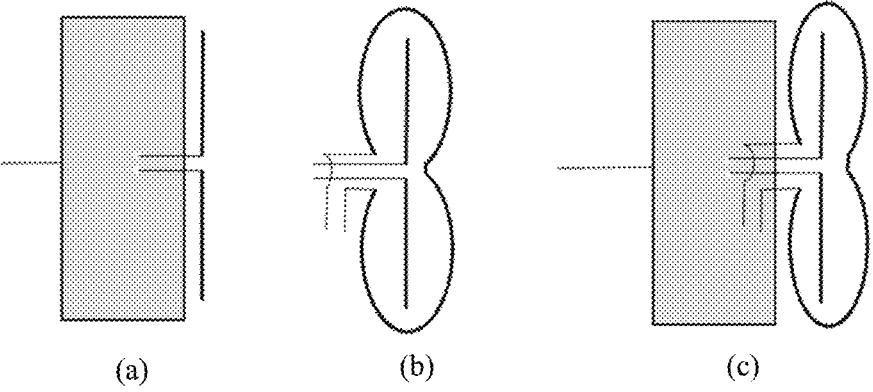
FIG. 3 is a schematic diagram of several integrated antennas.

Optionally, the antenna in this embodiment of this application may alternatively be an integrated antenna. The integrated antenna may have functions of any plurality of antennas of an electric near field antenna, a magnetic near field antenna, and a far field antenna. With reference to FIG. 3, the following describes several examples of integration of a near field antenna (e.g., an electric near field antenna and/or a magnetic near field antenna) and a far field antenna.

FIG. 3 is a schematic diagram of several integrated antennas. As shown in FIG. 3, an integrated antenna shown in (a) in FIG. 3 includes a reflection panel of a far field antenna and the far field antenna. The reflection panel of the far field antenna is shown by a shadow rectangle in (a) in FIG. 3. In other words, the reflection panel or a part of the reflection panel is used as an electric near field antenna. Therefore, (a) in FIG. 3 is integration of the electric near field antenna and the far field antenna.

An integrated antenna shown in (b) in FIG. 3 is a coil surrounding a magnetic near field antenna on a periphery of a far field antenna (in a weak radiation direction of the far field antenna). In other words, (b) in FIG. 3 is integration of the magnetic near field antenna and the far field antenna.

An integrated antenna shown in (c) in FIG. 3 includes a reflection panel of a far field antenna, the far field antenna, and a magnetic near field antenna in FIG. 3, and may be considered as a result of adding the reflection panel to (b) in FIG. 3, or may be considered as a result of adding the magnetic near field antenna to (a) in FIG. 3. Therefore, the integrated antenna shown in (c) in FIG. 3 is obtained by stacking or nesting the electric near field antenna, the magnetic near field antenna, and the far field antenna in a specific order.

It should be understood that the antennas shown in FIG. 2 and FIG. 3 are used merely as examples. In actual application, antennas are not limited to the foregoing shapes.

In an embodiment of this application, the magnetic near field antenna, the electric near field antenna, and the far field antenna may be integrated, or may be respectively implemented by using separate antennas. When separate antennas are used, because signals of antennas of different types are independent of each other, that is, there is little mutual interference, a spacing between the antennas does not need to be very large. To be specific, the spacing between the antennas of different types may be less than ½ of a wavelength or even less than 1/10 of a wavelength, while signal independence can still be maintained. This is different from a spatial multiplexing or diversity technology in which an antenna spacing greater than ½ of a wavelength is needed to achieve signal independence and implement parallel transmission of multiple signals. If an integrated antenna is used, an antenna structure can be more compact, thereby reducing a volume of an antenna module.

It should be noted that in this embodiment of this application, an antenna structure based on a liquid radio frequency material and technology may alternatively be used for the antenna to achieve a low-frequency ultra-wideband transmission effect.

Content such as specific internal structures of the modules in FIG. 1 and principles of electric near field communication, magnetic near field communication, and far field communication is described in detail later, and details are not described herein again.

The antenna apparatus shown in FIG. 1 includes a plurality of transmission links, including both an electric near field transmission link and a magnetic near field transmission link. In this structure, a signal or energy may be simultaneously transmitted or received by using a magnetic near field and an electric near field. Therefore, a signal capacity or an energy capacity can be effectively increased, and transmission efficiency is improved.

In the conventional technology, during near field communication, an antenna apparatus can transmit a signal only by using an electric near field transmission link or a magnetic near field transmission link. The antenna apparatus shown in FIG. 1 can simultaneously transmit or receive a signal or energy from the electric near field transmission link and the magnetic near field transmission link, thereby increasing the signal or energy capacity. In other words, in the solution in this embodiment of this application, simultaneously sending or receiving different signals or simultaneously sending or receiving more energy can be supported. Therefore, signal or energy transmission efficiency is effectively improved.

Figure 4:
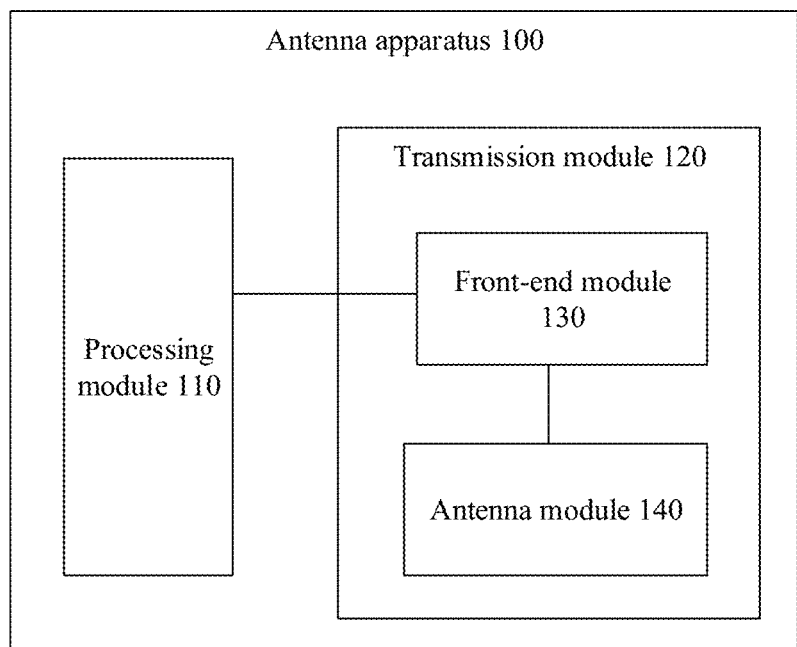
FIG. 4 is a schematic diagram of a structure of another antenna apparatus according to an embodiment of this application.

FIG. 4 is a schematic diagram of a structure of another antenna apparatus according to an embodiment of this application. The antenna apparatus 100 may be equivalent to the antenna apparatus shown in FIG. 1. It may be understood that FIG. 4 is obtained by logically dividing the transmission module 120 in FIG. 1 in another manner. As shown in FIG. 4, the antenna apparatus 100 includes a processing module 110 and a transmission module 120, and the transmission module 120 includes a front-end module 130 and an antenna module 140.

Because FIG. 4 is only an antenna apparatus logically divided in another manner, same logical modules use same numbers as those in FIG. 1. For related content, exactly refer to FIG. 1. For brevity, details are not described again. The front-end module 130 in FIG. 4 may be considered as a set including all front ends in FIG. 1, and the antenna module 140 in FIG. 4 may be considered as a set including all antennas in FIG. 1.

Figure 5:
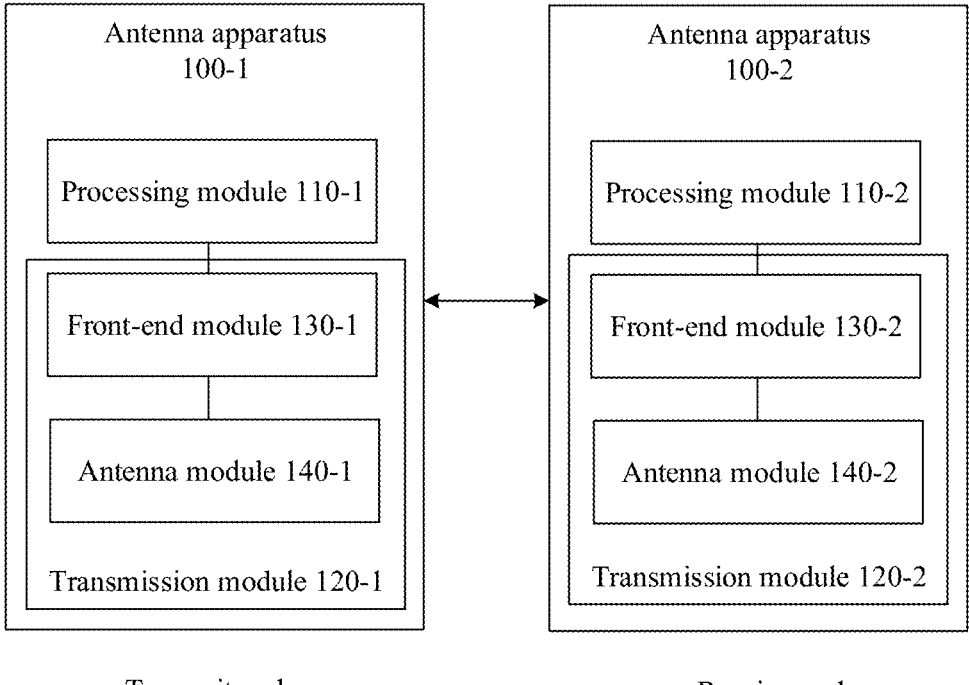
FIG. 5 is a schematic diagram of an architecture of an antenna system according to an embodiment of this application.

FIG. 5 is a schematic diagram of an architecture of an antenna system according to an embodiment of this application. The antenna system can transmit a signal or energy transmitted in an electric near field and a magnetic near field.

In some embodiments, the antenna system shown in FIG. 5 may further transmit a signal or energy radiated in a far field.

As shown in FIG. 5, the antenna system includes an antenna apparatus 100-1 at a transmit end and an antenna apparatus 100-2 at a receive end. The transmit end is used to represent an end that transmits a signal or energy outward. The antenna apparatus 100-1 is used as an antenna apparatus at the transmit end and is used to represent an antenna apparatus that transmits a signal or energy outward. It should be noted that, when transmitting a signal or energy, the antenna apparatus generally does not perform transmission at a fixed point or in a fixed direction. Therefore, the signal or energy transmitted by the antenna apparatus 100-1 is not necessarily transmitted only to the antenna apparatus 100-2.

The receive end is used to represent an end that receives a signal or energy. The antenna apparatus 100-2 is used as an antenna apparatus at the receive end and is used to represent an antenna apparatus that receives a signal or energy. It should be noted that, when receiving a signal or energy, the antenna apparatus may not perform reception at a fixed point or in a fixed direction. Therefore, the antenna apparatus 100-2 may not receive only the signal or energy from the antenna apparatus 100-1. In FIG. 5, an example in which the antenna system includes one transmit-end antenna apparatus 100-1 and one receive-end antenna apparatus 100-2 is mainly used for description. However, it should be understood that, in an actual situation, one antenna system may include a plurality of antenna apparatuses. Among these antenna apparatuses, quantities of antenna apparatuses that belong to a transmit end and a receive end are not limited, and an antenna apparatus at the transmit end may alternatively be used as an antenna apparatus at the receive end, or vice versa. The signal or energy transmitted by the antenna apparatus 100-1 at the transmit end is not necessarily received only by the antenna apparatus 100-2 at the receive end.

In an embodiment, the antenna apparatus 100-1 may include a processing module 110-1 and a transmission module 120-1 or 120-2. The transmission module 120-1 or 120-2 may include a plurality of transmission links. Each transmission link includes one front end and one antenna. The front end may be understood as a matching circuit of the antenna, and the antenna is configured to transmit or receive a signal or energy.

In an embodiment, the antenna apparatus 100-1 may include a processing module 110-1, a front-end module 130-1, and an antenna module 140-1. The processing module 110-1 may be configured to generate a to-be-transmitted signal or energy, and may be further configured to allocate the signal or energy. The front-end module 130-1 may be a matching circuit of the antenna module 140-1, or may be understood as a processing circuit connecting the processing module 110-1 and the antenna module 140-1. The front-end module 130-1 may include at least one electric near field front end and at least one magnetic near field front end, and may further include at least one far field front end. The antenna module 140-1 is used to represent an antenna, and is configured to transmit or receive a signal or energy. The antenna apparatus 100-1 may allocate, by using the processing module 110-1, the signal or energy that needs to be sent, then transmit the signal or energy to the antenna module 140-1 through at least one front end of the front-end module 130-1, and then transmit the signal or energy from the antenna module 140-1.

Each front end of the front-end module 130-1 is in a one-to-one correspondence with each antenna of the antenna module 140-1. It may be considered that the transmission module 120-1 or 120-2 is divided in two manners. One manner is to divide the transmission module 120-1 or 120-2 into a plurality of transmission links based on transmission paths, and the other manner is to assign the front end and the antenna to the front-end module 130-1 and the antenna module 140-1 respectively.

In some embodiments, the plurality of transmission links in the transmission module 120-1 or 120-2 include an electric near field transmission link and a magnetic near field transmission link. The electric near field transmission link includes an electric near field front end and an electric near field antenna. The electric near field front end is configured to process a signal or energy from the electric near field antenna, or is configured to transmit a signal or energy to the electric near field antenna. The electric near field antenna is configured to transmit or receive a signal or energy. The magnetic near field transmission link includes a magnetic near field front end and a magnetic near field antenna. The magnetic near field front end is configured to process a signal or energy from the magnetic near field antenna, or is configured to transmit a signal or energy to the magnetic near field antenna. The magnetic near field antenna is configured to transmit or receive a signal or energy.

In some other embodiments, the plurality of transmission links in the transmission module 120-1 or 120-2 may further include a far field transmission link. The far field transmission link includes a far field front end and a far field antenna. The far field front end is configured to process a signal or energy from the far field antenna, or is configured to transmit a signal or energy to the far field antenna. The far field antenna is configured to transmit or receive a signal or energy.

In an embodiment, the antenna apparatus 100-2 may include a processing module 110-2 and a transmission module 120-2. The transmission module 120-2 may include a plurality of transmission links. Each transmission link includes one front end and one antenna. The front end may be understood as a matching circuit of the antenna, and the antenna is configured to transmit or receive a signal or energy.

In an embodiment, the antenna apparatus 100-2 may include a processing module 110-2, a front-end module 130-2, and an antenna module 140-2. The antenna module 140-2 is used to represent a module including all antennas, and is configured to receive a signal or energy from another antenna apparatus, and transmit the received signal or energy to the front-end module 130-2. The front-end module 130-2 may be a matching circuit of the antenna module 140-2, or may be understood as a processing circuit connecting the processing module 110-2 and the antenna module 140-2, and is configured to transmit the signal or energy received by the antenna module 140-2 to the processing module 110-2. The front-end module 130-2 may include at least one electric near field front end and at least one magnetic near field front end, and may further include at least one far field front end. The processing module 110-2 may be configured to process the received signal or energy, for example, may combine signals or energy obtained from a plurality of front ends of the front-end module 130-2. The antenna apparatus 100-2 at the receive end may receive the signal or energy by using the antenna module 140-2, transmit the signal or energy to the front-end module 130-2, and transmit the signal or energy to the processing module 140-2 through at least one front end of the front-end module 130-2, and the processing module 140-2 performs subsequent processing.

In some embodiments, the plurality of transmission links in the transmission module 120-1 or 120-2 include an electric near field transmission link and a magnetic near field transmission link. The electric near field transmission link includes an electric near field front end and an electric near field antenna. The electric near field front end is configured to process a signal or energy from the electric near field antenna, or is configured to transmit a signal or energy to the electric near field antenna. The electric near field antenna is configured to transmit or receive a signal or energy. The magnetic near field transmission link includes a magnetic near field front end and a magnetic near field antenna. The magnetic near field front end is configured to process a signal or energy from the magnetic near field antenna, or is configured to transmit a signal or energy to the magnetic near field antenna. The magnetic near field antenna is configured to transmit or receive a signal or energy.

In some other embodiments, the plurality of transmission links in the transmission module 120-2 may further include a far field transmission link. The far field transmission link includes a far field front end and a far field antenna. The far field front end is configured to process a signal or energy from the far field antenna, or is configured to transmit a signal or energy to the far field antenna. The far field antenna is configured to transmit or receive a signal or energy.

Content such as specific internal structures of the modules in FIG. 1, FIG. 4, and FIG. 5 and principles of electric near field communication, magnetic near field communication, and far field communication is described in detail later, and details are not described herein again.

The front-end module 130-1 in the antenna apparatus 100-1 includes both an electric near field front end and a magnetic near field front end, and the antenna module 140-1 includes both an electric near field antenna and a magnetic near field antenna. Therefore, a signal or energy can be transmitted to the connected antennas from the electric near field front end and the magnetic near field front end simultaneously, and the signal or energy is transmitted from the antennas. In other words, one electric near field antenna is connected to each electric near field front end, and one magnetic near field antenna is connected to each magnetic near field front end, thereby forming a plurality of mutually independent transmission links, so that a signal or energy can be transmitted and transmitted from a plurality of electric near field transmission links or magnetic near field transmission links. In this structure, a signal or energy may be transmitted by using a magnetic near field and an electric near field simultaneously. Therefore, a signal capacity or an energy capacity can be effectively increased, and transmission efficiency is improved.

The antenna module 140-2 in the antenna apparatus 100-2 includes both an electric near field antenna and a magnetic near field antenna, and the front-end module 130-2 includes both an electric near field front end and a magnetic near field front end. Therefore, a signal or energy can be received from the electric near field antenna and the magnetic near field antenna simultaneously, and transmitted to the processing module 110-2 from the front ends connected to the electric near field antenna and the magnetic near field antenna. In other words, one electric near field antenna is connected to each electric near field front end, and one magnetic near field antenna is connected to each magnetic near field front end, thereby forming a plurality of mutually independent transmission links, so that a signal or energy can be received from a plurality of electric near field transmission links or magnetic near field transmission links and transmitted. In this structure, a signal or energy may be received by using a magnetic near field and an electric near field simultaneously. Therefore, a signal capacity or an energy capacity can be effectively increased, and transmission efficiency is improved.

In the conventional technology, during near field communication, an antenna apparatus can transmit a signal or energy only by using an electric near field transmission link or a magnetic near field transmission link. The antenna apparatus shown in FIG. 1, FIG. 4, or FIG. 5 can simultaneously transmit or receive a signal or energy from the electric near field transmission link and the magnetic near field transmission link, thereby increasing the signal or energy capacity. In other words, in the solution in this embodiment of this application, simultaneously sending different signals or simultaneously sending more energy can be supported. Therefore, signal or energy transmission efficiency is effectively improved.

Figure 6:
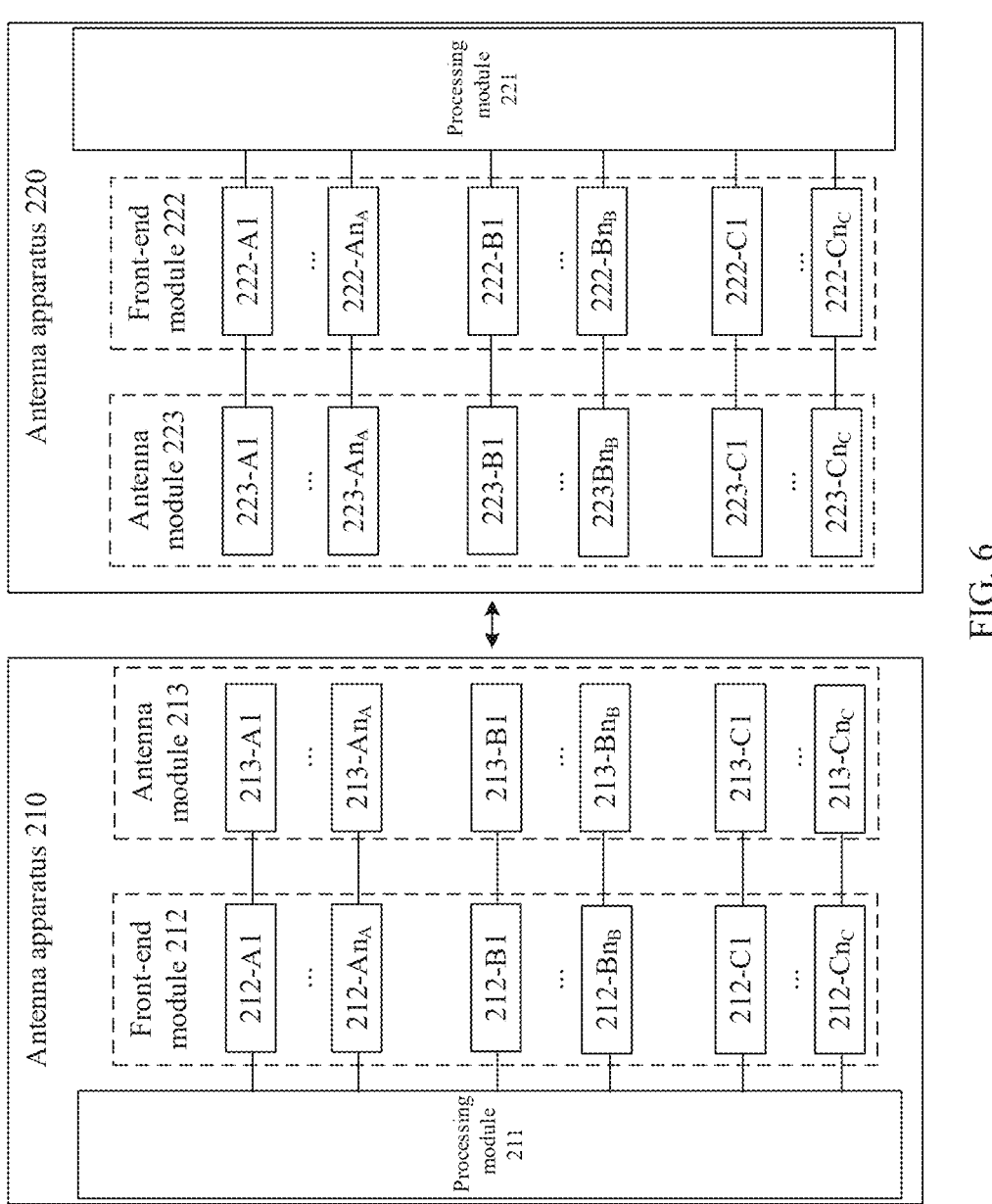
FIG. 6 is a schematic diagram of a structure of an antenna system according to an embodiment of this application.

FIG. 6 is a schematic diagram of a structure of an antenna system according to an embodiment of this application. FIG. 6 may be considered as an example of the antenna system shown in FIG. 5. A processing module 211 in FIG. 6 may be considered as an example of the processing module 110-1 in FIG. 5, a processing module 221 in FIG. 6 may be considered as an example of the processing module 110-2 in FIG. 5, a front-end module 212 in FIG. 6 may be considered as an example of the front-end module 130-1 in FIG. 5, a front-end module 222 in FIG. 6 may be considered as an example of the front-end module 130-2 in FIG. 5, an antenna module 213 in FIG. 6 may be considered as an example of the antenna module 140-1 in FIG. 5, and an antenna module

223 in FIG. 6 may be considered as an example of the antenna module 140-2 in FIG. 5.

Both the antenna module and the front-end module in FIG. 6 are represented by using dashed-line boxes. Replacing a solid line box with a dashed-line box has no other special meaning, and is merely intended to make FIG. 6 clearer.

As shown in FIG. 6, the front-end module 212 includes a plurality of electric near field front ends, a plurality of magnetic near field front ends, and a plurality of far field front ends. In FIG. 6, 212-A1 to 212-An$_A$ are used to represent the electric near field front ends, 212-B1 to 212-Bn$_B$ are used to represent the magnetic near field front ends, and 212-C1 to 212-Cn$_C$ are used to represent the far field front ends, where n$_A$, n$_B$, and n$_C$ are all positive integers, A, B, and C are used to distinguish the three types of front ends, and 1-n$_A$, 1-n$_B$, and 1-n$_C$ are numbers of the three types of front ends. Similarly, the front-end module 222 includes a plurality of electric near field front ends, a plurality of magnetic near field front ends, and a plurality of far field front ends. In FIG. 6, 222-A1 to 222-An$_A$ are used to represent the electric near field front ends, 222-B1 to 222-Bn$_B$ are used to represent the magnetic near field front ends, and 222-C1 to 222-Cn$_C$ are used to represent the far field front ends, where n$_A$, n$_B$, and n$_C$ are all positive integers, A, B, and C are used to distinguish the three types of front ends, and 1-n$_A$, 1-n$_B$, and 1-n$_C$ are numbers of the three types of front ends.

As shown in FIG. 6, the antenna module 213 includes a plurality of electric near field antennas, a plurality of magnetic near field antennas, and a plurality of far field antennas. The antennas in the antenna module 213 are in a one-to-one correspondence with the front ends in the front-end module 212. In FIG. 6, 213-A1 to 213-An$_A$ are used to represent the electric near field antennas, 213-B1 to 213-Bn$_B$ are used to represent the magnetic near field antennas, and 213-C1 to 213-Cn$_C$ are used to represent the far field antennas, where n$_A$, n$_B$, and n$_C$ are all positive integers, A, B, and C are used to distinguish the three types of antennas, and 1-n$_A$, 1-n$_B$, and 1-n$_C$ are numbers of the three types of antennas respectively. Similarly, the antenna module 223 includes a plurality of electric near field antennas, a plurality of magnetic near field antennas, and a plurality of far field antennas. The antennas in the antenna module 223 are in a one-to-one correspondence with the front ends in the front-end module 222. In FIG. 6, 223-A1 to 223-An$_A$ are used to represent the electric near field antennas, 223-B1 to 223-Bn$_B$ are used to represent the magnetic near field antennas, and 223-C1 to 223-Cn$_C$ are used to represent the far field antennas, where n$_A$, n$_B$, and n$_C$ are all positive integers, A, B, and C are used to distinguish the three types of antennas, and 1-n$_A$, 1-n$_B$, and 1-n$_C$ are numbers of the three types of antennas respectively.

It should be noted that in this embodiment of this application, the antennas are in a one-to-one correspondence with the front ends. One antenna and one front end may be considered as one transmission link. The transmission link may be understood as a module for processing a signal or energy to be transmitted or received by the antenna, for example, may be a signal processing circuit. For example, the transmission link may process an analog signal, and may include a digital-to-analog or analog-to-digital conversion unit, a filtering unit, a mixing unit, an impedance matching unit, and the like. The antenna may send an electromagnetic field signal to open space or receive an electromagnetic field signal from open space. Therefore, a signal or energy is neither sent at a fixed point nor received at a fixed point, that is, neither an antenna apparatus to which the signal or energy is sent nor an antenna apparatus from which the signal or energy is received is specified.

A transmission process may generally include unified processing of a baseband signal, for example, operations such as channel encoding, modulation, and scrambling. The process may be performed by using the processing module 211.

A reception process may also generally include unified processing of a baseband signal, for example, operations such as channel decoding, demodulation, and descrambling. The process may be performed by using the processing module 221. However, it should be understood that the foregoing module division is merely logical division. Therefore, the foregoing unified processing of the baseband signal may alternatively be performed by an independent module.

In an embodiment, the processing module 211 may allocate transmit power or energy on each front end based on a transmission status of an electromagnetic field, and may disable transmission of some links.

The allocation of transmit power can improve overall transmission efficiency as much as possible. For example, in a scenario suitable for far field communication, less power may be allocated to an electric near field transmission link and a magnetic near field transmission link, and more power is allocated to a far field transmission link. For another example, in a scenario suitable for electric near field communication, more power may be allocated to an electric near field transmission link, and less power is allocated to other transmission links.

It should be further understood that zero power may be allocated to one or more transmission links, that is, no transmit power is allocated to some transmission links. This is equivalent to disabling these transmission links. In an example, a plurality of transmission links include an electric near field transmission link and a magnetic near field transmission link. Allocating zero power to the electric near field transmission link is equivalent to using only the magnetic near field transmission link to transmit a signal or energy. Allocating power only to the electric near field transmission link or allocating power only to the magnetic near field transmission link is equivalent to implementing switching between the electric near field transmission link and the magnetic near field transmission link. If the plurality of transmission links include at least one electric near field transmission link, at least one magnetic near field transmission link, and at least one far field transmission link, during power allocation, only one or two of the transmission links may be selected, and this is equivalent to implementing automatic switching between the transmission links. It should be understood that, in this embodiment of this application, as power is allocated, the switching is performed and changes continuously, and is not hard switching. Therefore, the switching is more flexible and applicable.

In some other embodiments, the processing module 211 may be further configured to adjust the transmit power based on a receiving status of a receive end. The receiving status of the receive end may be received power fed back by the receive end, or may be obtained through calculation based on a current measured locally at a transmit end. The adjustment of transmit power can improve overall transmission efficiency as much as possible. For example, in a scenario suitable for far field communication, power allocated to the electric near field transmission link and the magnetic near field transmission link may be decreased, or even no power is allocated to the two transmission links, and power allocated to the far field transmission link is increased. For another example, in a scenario suitable for electric near field communication, power allocated to the electric near field transmission link may be increased. Which scenarios are suitable may be learned based on the receiving status. Therefore, adjusting power allocation based on the receiving status can implement switching between the transmission links according to different scenarios, and the switching is more accurate and flexible than hard switching.

In an embodiment, the processing module 221 may combine signals or energy from a plurality of front ends.

In this embodiment of this application, near field communication includes electric near field communication and magnetic near field communication. To be specific, in near field communication, an electric near field and a magnetic near field may be used to transmit a signal or energy simultaneously, so that a transmission capacity is increased, thereby improving transmission efficiency.

Figure 7:
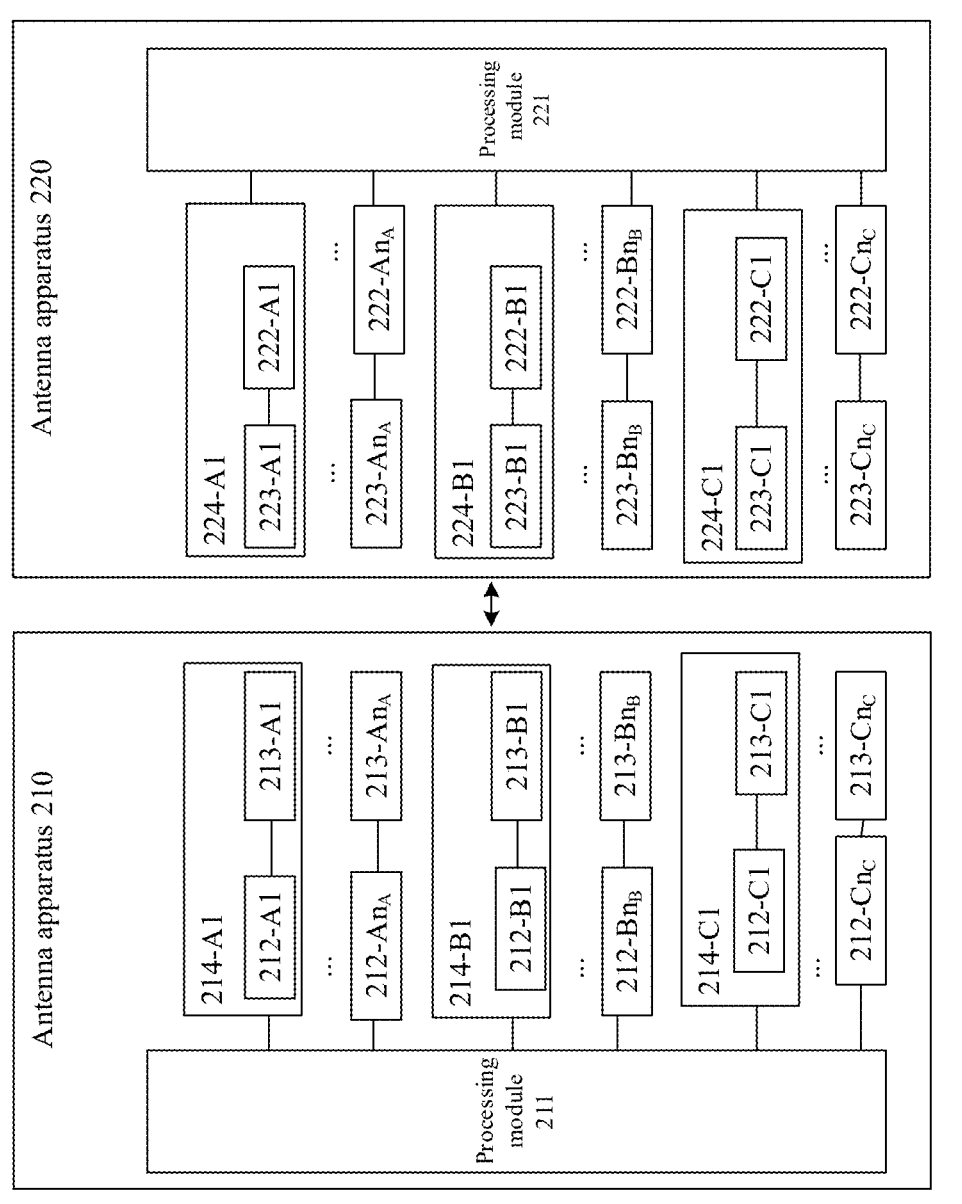
FIG. 7 is a schematic diagram of a structure of an antenna system according to an embodiment of this application.

FIG. 7 is a schematic diagram of a structure of an antenna system according to an embodiment of this application. FIG. 7 may be considered as an example of an antenna system structure corresponding to the logical division manner in FIG. 1. A transmission module of an antenna apparatus in FIG. 7 includes a plurality of transmission links. The plurality of transmission links (transmission links 214-A1, 214-B1, 214-C1, 224-A1, 224-B1, and 224-C1 are shown in FIG. 7) may be considered as an example of the plurality of transmission links in FIG. 1. As shown in FIG. 7, the transmission link 214-A1 includes an electric near field front end 212-A1 and an electric near field antenna 213-A1, the transmission link 214-B1 includes an electric near field front end 212-B1 and an electric near field antenna 213-B1, the transmission link 224-A1 includes an electric near field front end 222-A1 and an electric near field antenna 223-A1, and the transmission link 224-B1 includes an electric near field front end 222-B1 and an electric near field antenna 223-B1. For brevity, for other content in FIG. 7, exactly refer to related descriptions of FIG. 6 and FIG. 1. Details are not described again.

Figure 8:
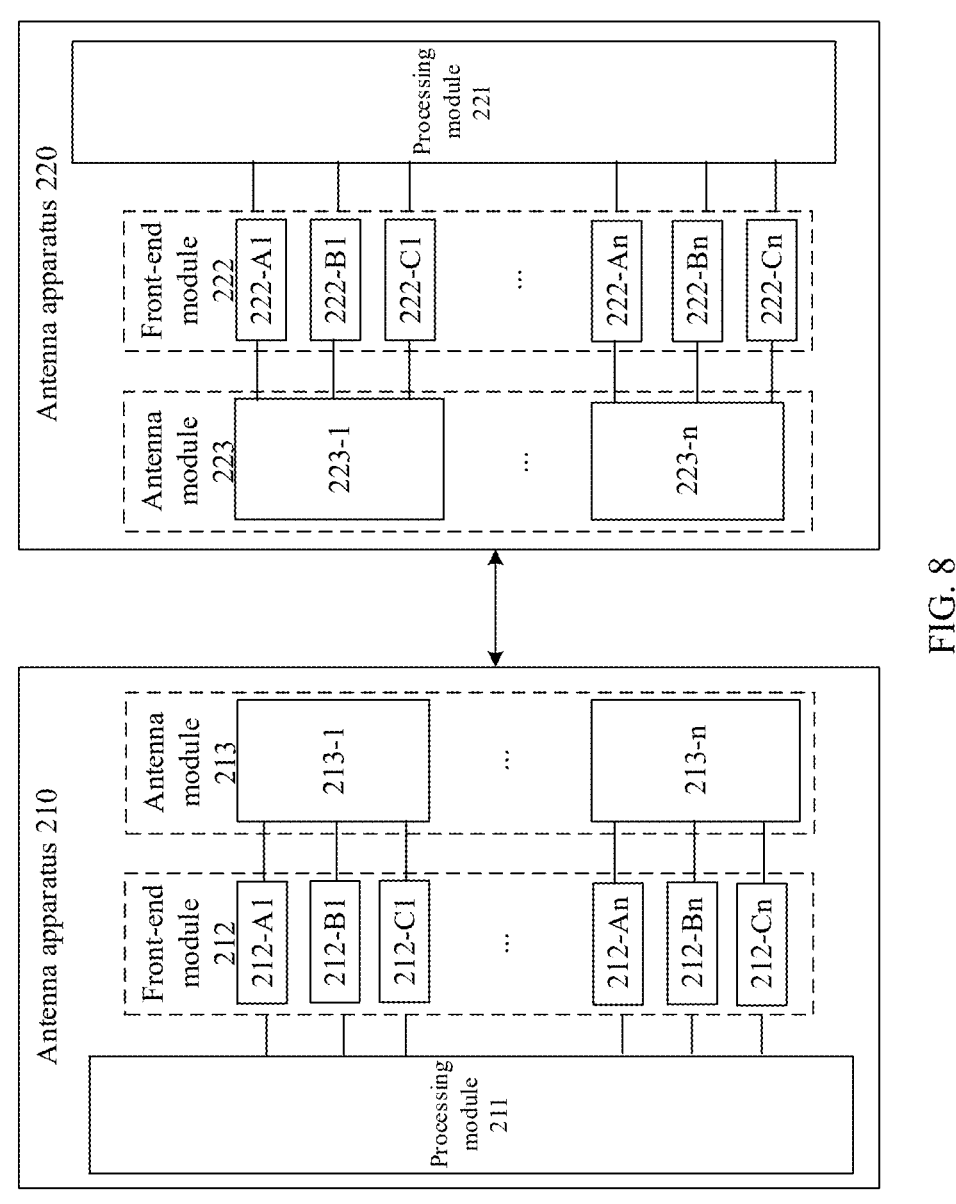
FIG. 8 is a schematic diagram of a structure of an antenna system according to an embodiment of this application.

FIG. 8 is a schematic diagram of a structure of an antenna system according to an embodiment of this application. Most parts of FIG. 8 and FIG. 6 are the same, and the same parts are not described again. A difference between FIG. 8 and FIG. 6 lies in that an antenna module 213 and an antenna module 223 shown in FIG. 8 include an integrated antenna, and the integrated antenna is an antenna that has functions of an electric near field antenna, a magnetic near field antenna, and a far field antenna. The integrated antenna shown in (c) in FIG. 3 may be used as an example of the integrated antenna in FIG. 8. As shown in FIG. 8, the antenna module 213 includes an integrated antenna 213-1 to an integrated antenna 213-*n*, where n is a sequence number of the integrated antenna. For each front end in a front-end module 212, refer to the description of FIG. 6. The front ends may be considered as a special example in which $n_A$, $n_B$, and $n_C$ in FIG. 6 are equal. Each front end in FIG. 8 also corresponds to a part of an integrated antenna. For example, an electric near field front end 212-A1 corresponds to an electric near field antenna part in the integrated antenna 213-1. If (c) in FIG. 3 is used as an example, the electric near field front end 212-A1 corresponds to a reflection panel in the integrated antenna 213-1. Others are not listed exhaustively.

For the description of the antenna module 223, refer to the antenna module 213. In addition, in the antenna module 223, an electric near field antenna may also be replaced with an electrode. In FIG. 8, integrated antennas are used. Therefore, the antenna structure can be more compact, a volume of the antenna module is reduced, and a volume of the antenna apparatus is reduced.

Figure 9:
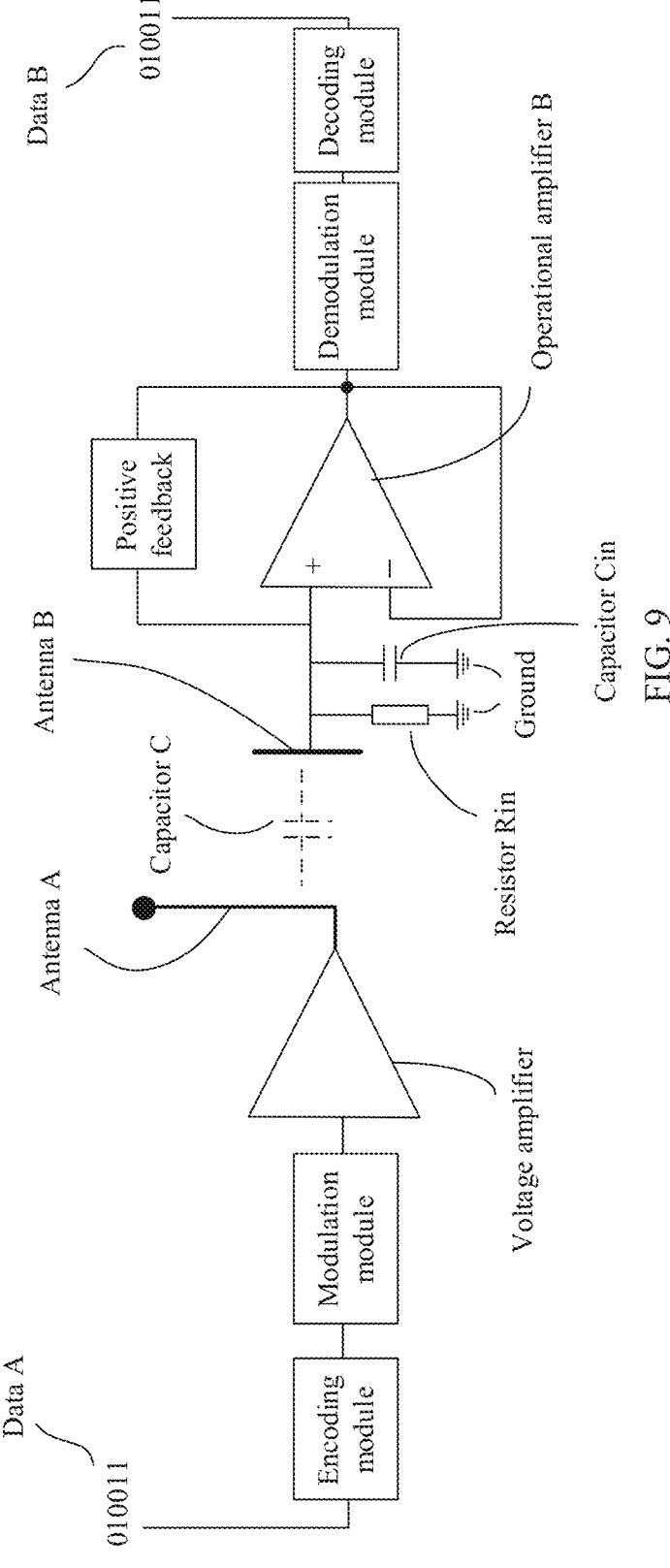
FIG. 9 is a schematic diagram of a circuit for electric near field communication according to an embodiment of this application.

FIG. 9 is a schematic diagram of a circuit for electric near field communication according to an embodiment of this application. In this embodiment of this application, electric near field communication (that is, signal transmission in an electric near field) is implemented based on a capacitive coupling. The capacitive coupling may be referred to as an electric field coupling or an electrostatic coupling, and is a coupling generated due to presence of distributed capacitance. An output end uses a voltage amplifier instead of a power amplifier used in a conventional electromagnetic radiation technology. Modulation is performed by using a local electric field, and a transmission medium may be any dielectric material. The dielectric material may be, for example, air or a human body, that is, any dielectric material between a transmit-end antenna and a receive-end antenna. For example, a signal may be transmitted through an equipotential surface of a human body. A change in the electric field may be induced and transmitted data may be restored. Such an electric near field has any high sensitivity, is limited only by heat and current noise, and does not dissipate electromagnetic energy. Therefore, power consumption of an antenna apparatus at a transmit end in a near field communication process can be greatly reduced, so that the antenna apparatus is applicable to ultra-low-power short-range communication and runs in an unlicensed spectrum (electric field spectrum). In addition, in the electric near field, a design of a transmit-end antenna (that is, an electric near field antenna at a transmit end) and a receive-end antenna (that is, an electric near field antenna or an electrode at a receive end) may be highly flexible. Received signal strength at the receive end is in a linear proportional relationship with a transmit voltage at the transmit end, in a linear proportion to an area of an antenna in an antenna module at the receive end, and in a linear relationship with a length of an antenna in an antenna module at the transmit end.

FIG. 9 includes an equivalent circuit of an antenna apparatus at the transmit end (replaced with "the transmit end" in the following content of FIG. 9 for brevity) and an equivalent circuit of an antenna apparatus at the receive end (replaced with "the receive end" in the following content of FIG. 9 for brevity). A capacitive coupling is formed between the two equivalent circuits by a transmission medium (any dielectric material herein), and is represented by a dashed-line capacitance symbol in FIG. 9, that is, a capacitor C in FIG. 9. The transmit end includes an encoding module, a modulation module, a voltage amplifier, and an antenna A. The encoding module and the modulation module may perform specific processing on to-be-transmitted data, so that transmission quality is higher. The encoding module and the modulation module are components of the processing module, and the voltage amplifier is a component of an electric near field front end. The receive end includes an antenna B (the antenna B may be an electrode), a resistor Rin, a capacitor Cin, an operational amplifier B, a demodulation module, and a decoding module, where the resistor Rin, the capacitor Cin, and the operational amplifier B are components of an electric near field front end, and the demodulation module and the decoding module are components of a processing module.

It should be noted that in FIG. 9, an example in which the antenna A is an electric near field antenna and the antenna B is an electrode is mainly used for description.

As shown in FIG. 9, data A (for example, 010011 shown in the figure) is encoded by the encoding module, modulated by the modulation module, and then input to the voltage amplifier. An amplified signal or energy is transmitted by the antenna A, coupled to the antenna B by using the capacitor C, then input to the operational amplifier B by using the resistor Rin and the capacitor Cin, then demodulated by the demodulation module and decoded by the decoding module, so that data B is obtained. If the transmitted data is correct, content of the data B is the same as content of the data A.

The electric near field communication has many advantages. For example, a size of an antenna is not limited by a signal wavelength. Therefore, the electric near field antenna can be designed in any shape or size, and can be further miniaturized. A length of an antenna may be much smaller than a wavelength. For example, a wavelength for transmitting or receiving a 10 megahertz (MHz) signal may be 30 meters. However, in electric near field communication, a size of the electric near field antenna at the transmit end needs to reach a diameter of 1 centimeter only, and an electrode at the receive end may also have a centimeter-level size. There is no obvious electromagnetic power when electric near field communication is used, and power that needs to be consumed is related only to self-capacitance of a transmit antenna. In addition, in electric near field communication, the transmit end uses a voltage amplifier and does not use a power amplifier. A function of the voltage amplifier is to increase a voltage, so that a transmission range can be expanded, instead of feeding power to a tuned antenna. Therefore, when other conditions are the same, power consumption of the electric near field antenna is lower than power consumption of a near field antenna in the conventional technology, and power consumption of the voltage amplifier is lower than power consumption of a power amplifier in the conventional technology. Therefore, power consumption in electric near field communication in this embodiment of this application is far lower than power consumption in short range communication using an electromagnetic radiation technology in the conventional technology.

The foregoing transmission medium (dielectric material between the transmit end and the receive end) is explained as follows: In electric near field communication, the transmission medium may be any dielectric material, for example, air or an equipotential surface of a human body, and the transmission medium can form a capacitive coupling between the transmit end and the receive end.

In some embodiments, a positive feedback may be added to the receive end to induce a change of the electric field and restore transmitted data. The positive feedback is added, so that the antenna apparatus at the receive end can have any high sensitivity and is limited only by heat and current noise. As shown in FIG. 9, the positive feedback is disposed between a positive input end and an output end of the operational amplifier B, a negative input end of the operational amplifier B is connected to the output end of the operational amplifier B, the positive input end of the operational amplifier B is connected to a first end of the resistor Rin and a first end of the capacitor Cin, and a second end of the resistor Rin and a second end of the capacitor Cin are both grounded. It should be understood that, in the solution in FIG. 9, the positive feedback part may be removed, and technical effects of reducing power consumption and improving transmission efficiency can still be achieved, but sensitivity can be further improved by adding the positive feedback. In other words, an electric near field transmission link at the receive end can achieve the technical effects of reducing power consumption and improving transmission efficiency without using the positive feedback, but the positive feedback can improve sensitivity on this basis. Optionally, the antenna apparatus in this embodiment of this application may be designed by using a component or the like obtained by using a very large scale integration complementary metal oxide semiconductor (VLSI CMOS) technology, so that power consumption can be further reduced.

Because the received signal strength is in a linear proportional relationship with the transmit voltage and is in a linear proportional relationship with an area of an antenna or an electrode at the receive end, a length or an area and a shape of the antenna may be determined based on a signal strength requirement. If the antenna at the receive end is a geometrical cable layout on a printed circuit board, the received signal strength may also be in a linear relationship with the length of the antenna at the receive end. This is because the cable layout on the PCB is relatively narrow and a cable layout of the same width may be used. Therefore, the area of the antenna is in a fixed proportional relationship with the length.

Figure 10:
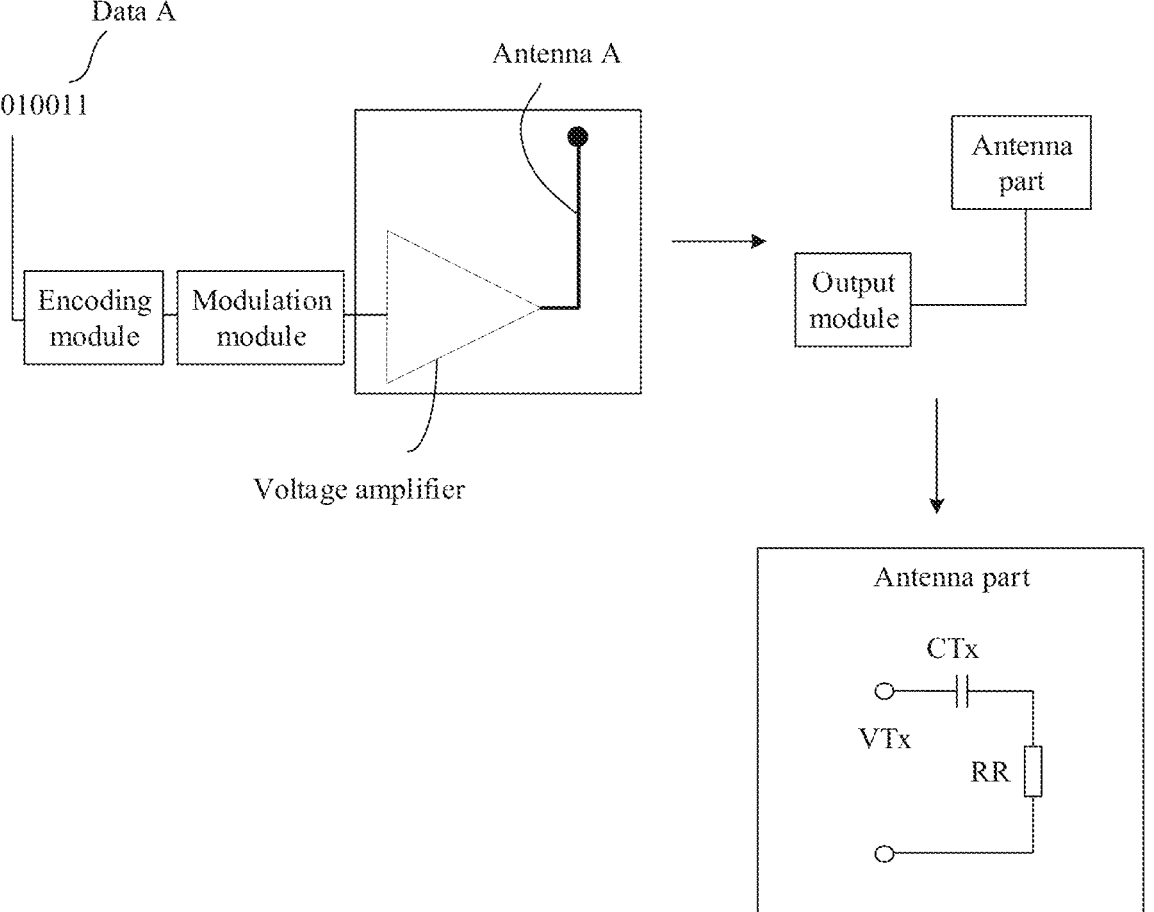
FIG. 10 is a schematic diagram of an equivalent circuit for electric near field communication at a transmit end according to an embodiment of this application.
Figure 11:
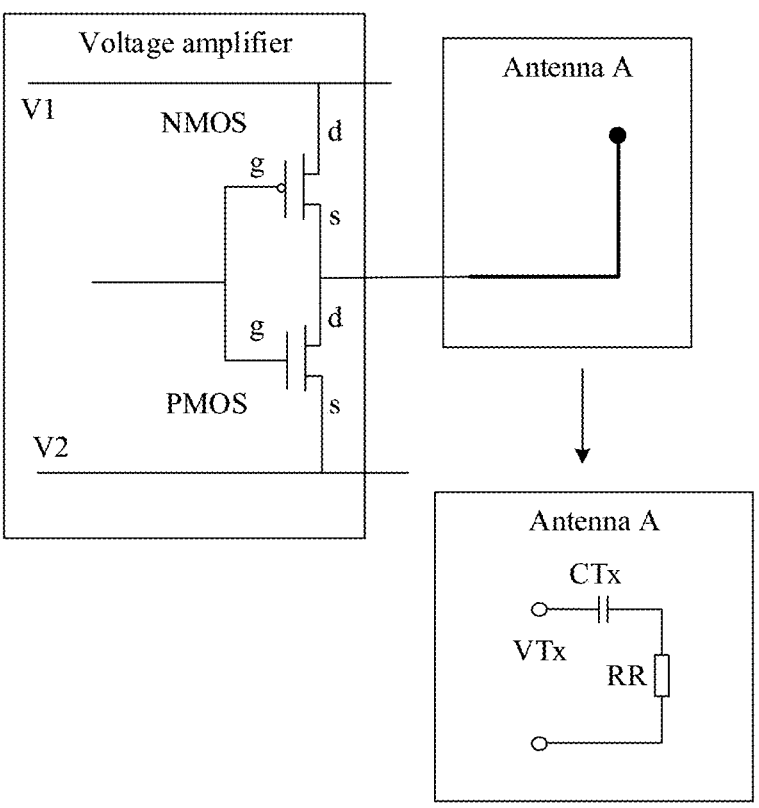
FIG. 11 is a schematic diagram of an internal structure of the circuit shown in FIG. 10.

With reference to FIG. 10 and FIG. 11, the following describes the antenna apparatus at the transmit end in FIG. 9. FIG. 10 is a schematic diagram of an equivalent circuit for electric near field communication at the transmit end according to an embodiment of this application. As shown in FIG. 10, a schematic diagram of the electric near field front end and the antenna may be obtained by partially magnifying the voltage amplifier and the antenna A in FIG. 9. An output module in FIG. 10 may be considered as an equivalent circuit of the electric near field front end, and the antenna part may be considered as an equivalent circuit of the electric near field antenna. The equivalent circuit of the electric near field antenna is shown in a solid-line box in FIG. 10. In other words, a capacitor and a resistor are connected in series between two ends of an output voltage. $V_{Tx}$ in FIG. 10 is used to represent the output voltage, and $C_{Tx}$ and $R_R$ respectively represent the capacitor and the resistor of the electric near field antenna.

Power consumption in the electric near field communication process is a sum of power consumption of the voltage amplifier and power consumption of the electric near field antenna. Alternatively, it may be understood that the power consumption of the electric near field front end plus the power consumption of the electric near field antenna is the power consumption of the transmission link in the electric near field communication process. For an equivalent circuit of the voltage amplifier, refer to FIG. 11.

FIG. 11 is a schematic diagram of an internal structure of the circuit shown in FIG. 10. In FIG. 11, the equivalent circuit of the amplifier is in a left box, and the equivalent circuit of the electric near field antenna is in a right box. The equivalent circuit of the electric near field antenna has been described in FIG. 10, and details are not described again. As shown in FIG. 11, an N-type metal oxide semiconductor (NMOS) transistor and a P-type metal oxide semiconductor (PMOS) transistor are connected between two ends V1 and V2 of the voltage amplifier. A drain d of the NMOS is connected to V1, a gate g of the NMOS is connected to a gate g of the PMOS, a source s of the NMOS is connected to a drain d of the PMOS, a source s of the PMOS is connected to V2, and one end of the antenna A is connected to the source s of the NMOS and the drain d of the PMOS. It should be understood that FIG. 11 shows an example of a common circuit structure of a voltage amplifier, which is a typical inverter structure. A person skilled in the art may also use another circuit structure of a same or similar shape based on an actual requirement. Details are not listed exhaustively herein.

As described above, when other conditions are the same, power consumption of the electric near field antenna is lower than power consumption of a near field antenna in the conventional technology, power consumption of the voltage amplifier is lower than power consumption of a power amplifier in the conventional technology, and near field transmission efficiency of the voltage amplifier is higher than transmission efficiency of the power amplifier in the conventional technology. Therefore, power consumption in electric near field communication in this embodiment of this application is lower than power consumption in short range communication using an electromagnetic radiation technology in the conventional technology, but transmission efficiency is higher than transmission efficiency of short range communication using the electromagnetic radiation technology. In addition, in the conventional technology, near field communication is performed by using the electromagnetic field radiation technology, instead of a manner of separating an electric near field and a magnetic near field in this application, and a signal can be transmitted only from one of an electric field and a magnetic field and cannot be transmitted from the electric near field and the magnetic near field simultaneously. In near field communication in this embodiment of this application, a signal can be transmitted from the electric near field and the magnetic near field simultaneously. Therefore, a capacity is larger, and signal or energy transmission efficiency is effectively improved.

It should be noted that near field communication and far field communication are relative concepts, and that short range communication and long range communication are relative concepts. For example, in short range communication, both near field communication and far field communication may be used. Near field communication and far field communication are classified based on wavelengths, and there is no strict demarcation between near field communication and far field communication. Short range communication and long range communication are simply classified based on a distance between a transmit end and a receive end, without involving wavelengths. The electromagnetic radiation technology is a technology without regard for near field communication or far field communication, and a limitation of the technology determines that the electromagnetic radiation technology is used only for short range communication.

The foregoing describes related structures and principles of electric near field communication with reference to FIG. 9 to FIG. 11. The following describes magnetic near field communication with reference to FIG. 12 and FIG. 13.

Figure 12:
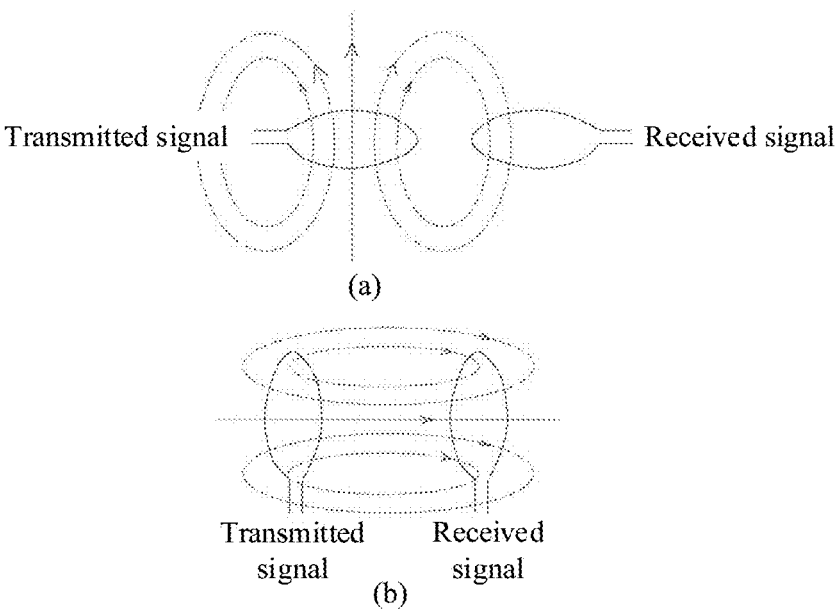
FIG. 12 is a schematic diagram of signal transmission in a magnetic near field.

FIG. 12 is a schematic diagram of signal transmission in a magnetic near field. As shown in FIG. 12, both a transmit-end antenna and a receive-end antenna may use loop coils. After a transmitted signal is input from the transmit-end antenna, the transmitted signal is transmitted to the receive-end antenna through a magnetic field, and is received by a receive end as a received signal. Both a dashed-line circular loop and a dashed straight line with arrows in FIG. 12 represent magnetic lines. When two antenna coils are at a same horizontal line, directions of the magnetic lines are shown in (a) in FIG. 12. When the two coils are opposite, directions of the magnetic lines are shown in (b) in FIG. 12.

It should be noted that magnetic near field communication is implemented based on an inductive coupling. A transmit antenna is usually a loop antenna, and may be in a shape of a circular loop or a square loop. FIG. 12 shows a circular loop. To enhance a coupling effect, a multi-turn coil may be used to form a multi-layer loop antenna. Most receive antennas also use loop antennas or coils, but may also use magnetic field sensors, such as Hall magnetic field sensors or quantum magnetic field sensors, to obtain sensitivity higher than that of an ordinary coil and implement magnetic near field communication over a relatively long distance. When a loop antenna or a coil is used, to enhance the coupling, an area enclosed by the antenna coil needs to be as large as possible. In this way, a relatively large quantity of common magnetic lines pass through the transmit antenna and the receive antenna, and strong mutual inductance is formed. To further increase a transmission distance of a magnetic near field, an inductor-capacitor resonance method may be further used. To be specific, a magnetic near field front end includes a capacitor connected in parallel with a magnetic near field antenna, to form an inductor-capacitor oscillation. A center frequency $f_0=1/[2\pi*\mathrm{sqrt}(LC)]$ of the oscillation represents a carrier frequency, where L and C respectively represent the inductor of the magnetic near field antenna and the capacitor connected in parallel. The capacitor may be adjustable. In this way, a center frequency of transmission can be changed based on a requirement. Generally, there is a resistor on an inductor-capacitor resonant circuit, the resistor may have impact on remaining energy of a transmit end and energy received by a receive end after each oscillation, and the impact is represented by a quality factor $Q=R/(2\pi f_0 L)$. The quality factor affects a transmission distance and a communication bandwidth. If the quality factor Q is larger, the transmission distance is longer, but the communication bandwidth is smaller, because the communication bandwidth may be expressed as $B=f_0/Q$, that is, the communication bandwidth B is a quotient of the center frequency and the quality factor. Therefore, to adjust the transmission distance, an adjustable resistor may be connected to the capacitor in series. Therefore, a basic structure is shown in FIG. 10. In practice, to further improve performance, for example, to increase a transmission distance, a signal amplifier, a filter, and an additional resonant component may be added at a front end.

Figure 13:
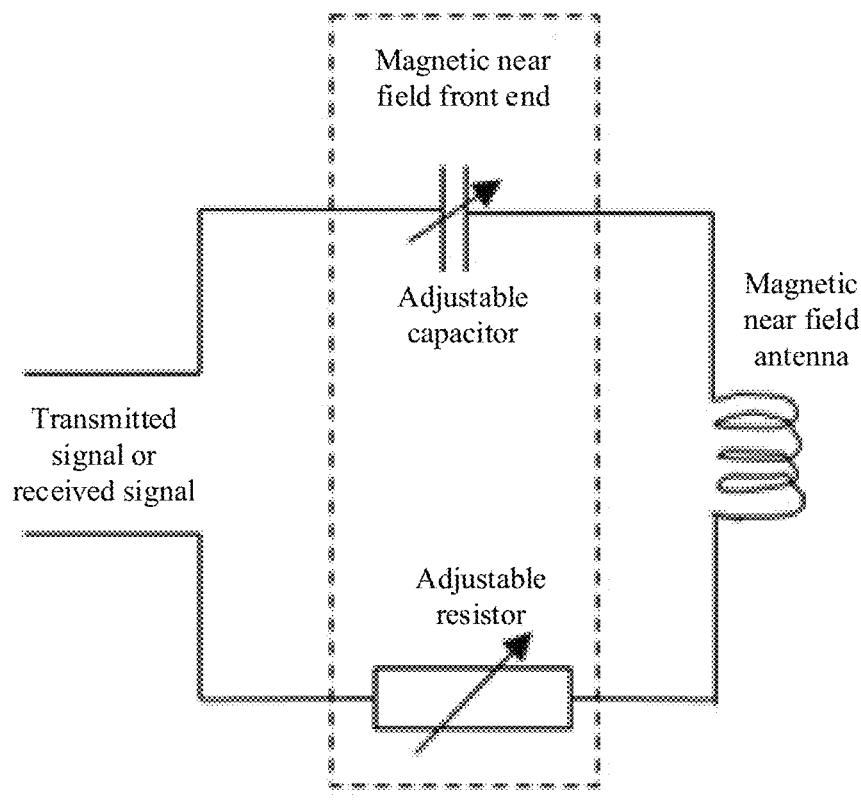
FIG. 13 is a schematic diagram of an equivalent circuit of a magnetic near field transmission link according to an embodiment of this application.

It should be noted that the antennas in FIG. 12 and FIG. 13 are both magnetic near field antennas, referred to as antennas for brevity. However, it should be understood that the antennas herein are magnetic near field antennas.

FIG. 13 is a schematic diagram of an equivalent circuit of a magnetic near field transmission link according to an embodiment of this application. As shown in FIG. 13, a magnetic near field front end includes an adjustable capacitor C1 and an adjustable resistor R1, and a magnetic near field antenna is represented by a multi-turn coil. In an actual scenario, a signal or energy from a processing module may be input to the magnetic near field antenna by using the magnetic near field front end, and then transmitted from the magnetic near field antenna. A signal or energy received from the magnetic near field antenna may also be input to the processing module by using the magnetic near field front end. The adjustable capacitor and the adjustable resistor may be used to adjust a resonance frequency.

Figure 14:
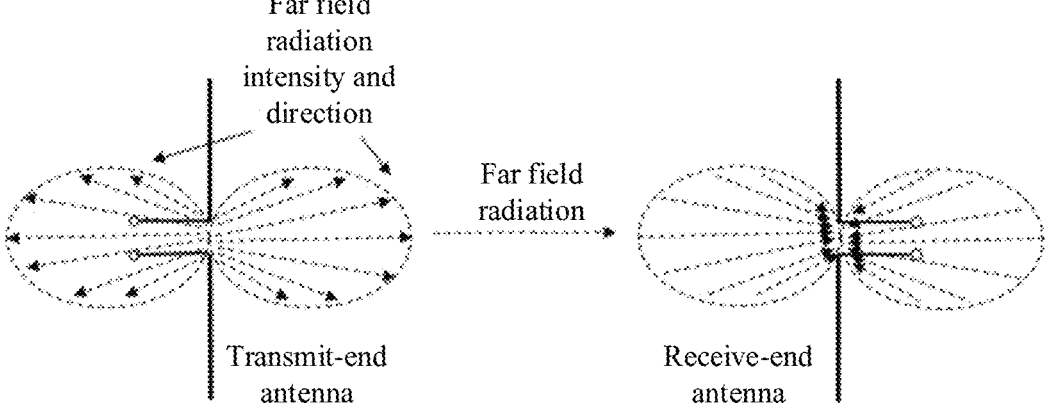
FIG. 14 is an example diagram of transmission and reception of an electric dipole antenna in far field communication according to an embodiment of this application.
Figure 15:
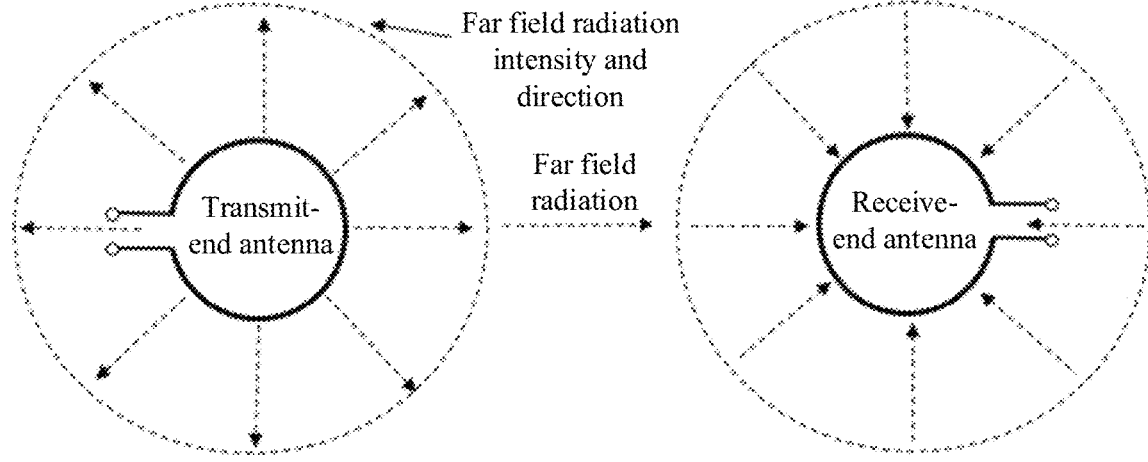
FIG. 15 is an example diagram of transmission and reception of a magnetic dipole antenna in far field communication according to an embodiment of this application.

The foregoing mainly describes magnetic near field communication with reference to FIG. 12 and FIG. 13. The following describes far field communication with reference to FIG. 14 to FIG. 16. Similarly to magnetic near field communication, a person skilled in the art may select any far field antenna based on an actual requirement to apply the far field antenna to an embodiment of this application. Therefore, for brevity, in this embodiment of this application, only an example in which the far field antenna is a dipole antenna is used for brief description, and other far field antennas are not described. The dipole antenna is a very basic type of far field antenna. Dipole antennas include an electric dipole antenna and a magnetic dipole antenna. Currently, based on basic operating principles of the two dipole antennas, researchers have designed a plurality of more complex antennas to meet diversified requirements in terms of frequency, bandwidth, beam direction, and the like. Herein, the two types of antennas are used as an example to describe the basic principles, and a specific antenna design is not limited. FIG. 14 and FIG. 15 respectively show far field transmitting and receiving principles of an electric dipole antenna and a magnetic dipole antenna in a specific case. FIG. 14 is an example diagram of transmission and reception of an electric dipole antenna in far field communication according to an embodiment of this application. FIG. 15 is an example diagram of transmission and reception of a magnetic dipole antenna in far field communication according to an embodiment of this application. It can be learned from FIG. 14 and FIG. 15 that a transmit-end antenna has different transmit directions, and only far field transmission along a specific direction can be received by a receive-end antenna. It should be understood that the transmit-end antenna in FIG. 14 to FIG. 16 is a far field antenna at a transmit end, and that the receive-end antenna is a far field antenna at a receive end.

Figure 16:
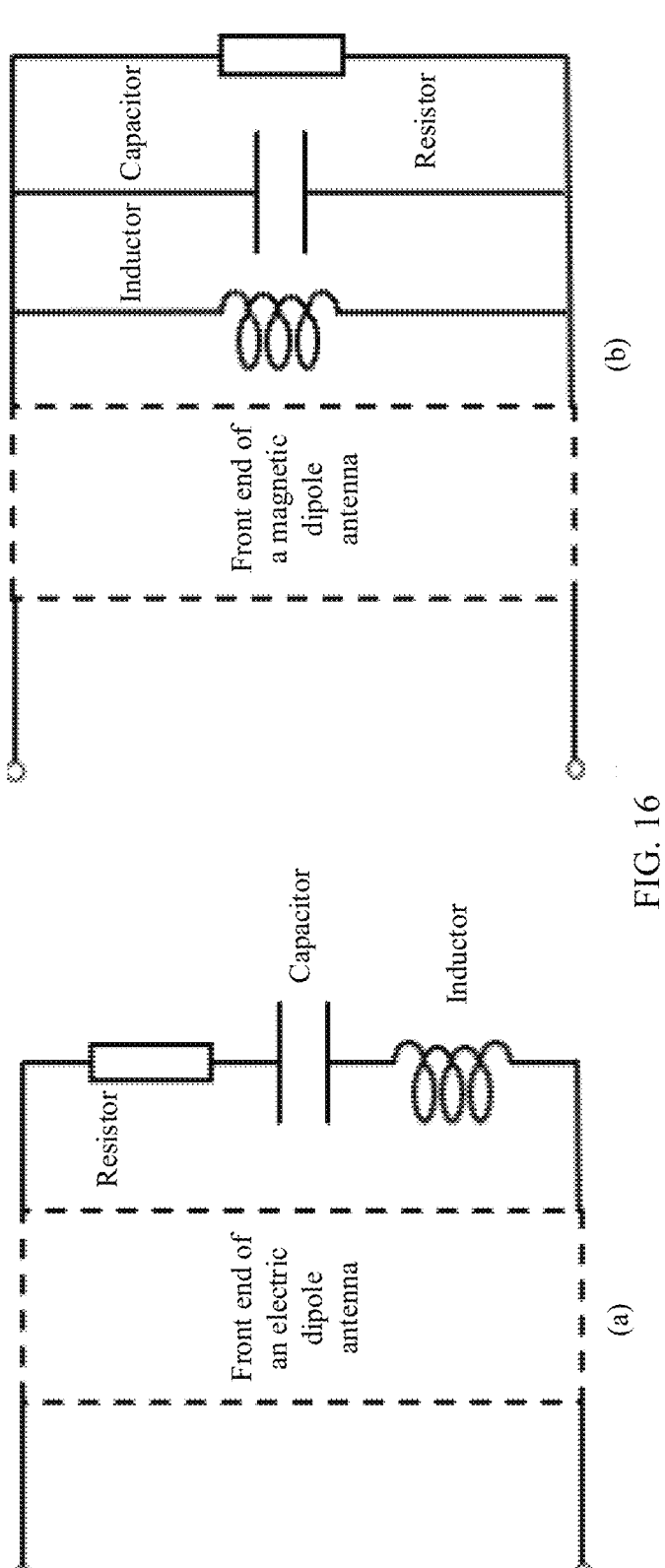
FIG. 16 is a schematic diagram of an equivalent circuit of a transmission link for far field communication according to an embodiment of this application.

FIG. 16 is a schematic diagram of an equivalent circuit of a transmission link for far field communication according to an embodiment of this application. (a) in FIG. 16 shows an equivalent circuit of a transmission link on which an electric dipole antenna is located, and (b) in FIG. 16 shows an equivalent circuit of a transmission link on which a magnetic dipole antenna is located. Alternatively, it may be understood that (a) shows an equivalent circuit of an electric far field, and (b) shows an equivalent circuit of a magnetic far field. It can be learned from FIG. 16 that, in the electric far field (that is, (a) in FIG. 16), equivalently, a resistor, a capacitor, and an inductor are connected in series at two ends of a front end (an example of a far field front end) of the electric dipole antenna. In the magnetic far field (that is, (b) in FIG. 16), equivalently, a resistor, a capacitor, and an inductor are connected in parallel at two ends of a front end (another example of the far field front end) of the magnetic dipole antenna. A transmit capability of the antenna is represented by transmit impedance, and a resonance frequency is determined by capacitance and inductance. The inductance and capacitance are adjustable. Therefore, the resonance frequency is also adjustable.

The foregoing mainly describes overall modular composition and structures of the antenna apparatuses in the embodiments of this application with reference to the figures, and separately describes electric near field communication, magnetic near field communication, and far field communication. In addition, the foregoing also mentions that energy or power may be allocated by using a processing module. The following describes content of this part in detail.

In an embodiment of this application, a signal or energy may be sent from any two or three of an electric near field, a magnetic near field, and an electromagnetic far field simultaneously. However, there is a problem of mutual interference. For example, in a possible method, a processing module at a transmit end divides a signal into three signals, and sends the three signals to a magnetic near field transmission link, an electric near field transmission link, and a far field transmission link respectively. Herein, signals transmitted on the transmission links are located in a same frequency band, or frequency bands of the signals overlap.

Each of a magnetic near field transmission link, an electric near field transmission link, and a far field transmission link at a receive end receives three signals. For example, the magnetic near field transmission link should receive only a magnetic near field signal, the electric near field transmission link should receive only an electric near field signal, and the far field transmission link should receive only a far field signal. However, in addition to the signal of the link itself, signals of the other two links are also received. In addition, because the frequency bands are the same or overlap, there is potential interference. The following analyzes the interference.

It is assumed that an electric near field signal, a magnetic near field signal, and a far field transmit signal at the transmit end are represented by Te, Tm, and Tx respectively, and that an electric near field signal, a magnetic near field signal, and a far field transmit signal at the receive end are represented by Re, Rm, and Rx respectively.

First, a receiving status of Te is checked. As mentioned above, coupling strength of the electric near field signal mainly depends on capacitance between the transmit end and the receive end. Given the same transmit end, strength of a received signal is mainly determined by an area that is of an electric near field antenna (or electrode) at the receive end and that is directly opposite to a transmit antenna. As described above, the electric near field antenna at the receive end is an electrode having a specific area, and the magnetic near field antenna is a loop antenna or a coil, and an area enclosed by the antenna is relatively large, but an area of an antenna body itself is relatively small. Usually, a conducting wire is relatively slim, and a far field antenna may use a relatively slim antenna body, so that an area can be reduced. Because the area of the electric near field antenna is far greater than areas of the magnetic near field antenna and the far field antenna, signal strength (denoted as Rme and Rxe respectively) of Te received on the magnetic near field link and the far field link is far lower than that of Re, that is, Rme<<Re, and Rxe<Re.

The following uses an example for description. It is assumed that the electric near field antenna at the receive end is a disc with a diameter of 2 centimeters, that is, the area of the electric near field antenna is 21 square centimeters; the magnetic near field antenna is a five-turn circular loop antenna with a diameter of 1 to 1.4 centimeters, and a spacing between the turns is 0.05 centimeter; and the far field antenna is a dipole antenna, and a length of each side is 10 centimeters, a width is 0.05 centimeter, and a transmission frequency is 40 MHz. Capacitive coupling strength of the electric near field signal on the electric near field antenna, approximately calculated according to an area relationship, is about 13 times that on the magnetic near field antenna and 3 times that on the far field antenna. Further, because the magnetic near field antenna is usually a closed loop, an electric potential generated by the capacitive coupling cannot form an obvious electric potential difference at each position of the magnetic near field antenna, and cannot directly form an interference signal. Only weak induced electric potential differences at different positions of the antenna finally form an interference signal, which accounts for only a small proportion of coupling energy and depends on coupling differences at different positions of the antenna. Interference received on the far field antenna is also similar. Therefore, an interference signal generated by the electric near field is far weaker than a signal received by the electric near field antenna. The electric near field antenna also transmits a small quantity of signals. However, due to a size mismatch, for example, because a size of the electric near field antenna is far smaller than that of the far field antenna in the foregoing example, a proportion of electric near field signals transmitted to the far field antenna is almost very small.

Then a receiving status of Tm is checked. Coupling strength of the magnetic near field signal depends on a common magnetic flux, that is, a mutual inductance coefficient. Usually, the electric near field antenna does not have a closed loop for feeding a received signal. Therefore, an induced (that is, a magnetic near field signal) received by the electric near field antenna is very weak. For the far field antenna, an open antenna or an antenna whose closed area is far less than that of the magnetic near field antenna is generally used. An open antenna refers to a far field antenna on which there is no path from one connection port to another connection port along an antenna body, as shown in (c) in FIG. 2. Therefore, the received induced signal is also very weak. Therefore, Rem<<Rm, and Rxm<<Rm, where Rem and Rxm are magnetic near field signals that are received by the electric near field antenna and the far field antenna respectively from the magnetic near field antenna.

For reception of Tx, first, a size of the electric near field antenna or the magnetic near field antenna is smaller than that of the far field antenna at the receive end. In the foregoing example, sizes of the electric near field antenna and the magnetic near field antenna are 2 centimeters and 1.4 centimeters respectively, and a size of the far field antenna is 20 centimeters. Therefore, a received signal Rex on the electric near field antenna and a received signal Rmx on the magnetic near field antenna are far weaker than a received signal Rx on the far field antenna, that is, Rex<<Rx, and Rmx<<Rx.

Therefore, when a far field antenna, an electric near field antenna, and a magnetic near field antenna at the transmit end simultaneously transmit signals Tx, Te, and Tm respectively, received signal-to-interference ratios of the far field antenna, the electric near field antenna, and the magnetic near field antenna at the receive end are Rx/(Rxe+Rxm), Re/(Rem+Rex), and Rm/(Rme+Rmx) respectively, where Rme<<Re, Rxe<<Re, Rem<<Rm, Rxm<<Rm, Rex<<Rx, and Rmx<<Rx, as described above. Therefore, it cannot be ensured that each signal-to-interference ratio is sufficiently small. Therefore, additional conditions are further needed, so that Rx, Re, and Rm are relatively close. For example, a difference is controlled within a specific threshold. In this way, it can be ensured that each transmission link obtains a relatively high signal-to-interference ratio, so that the system has a relatively good signal or energy capacity.

In other words, making Rx, Re, and Rm relatively close can make the signal-to-interference ratio relatively small.

To make Rx, Re, and Rm relatively close, transmit signal power Tx, Te, and Tm may be adjusted based on an initial received signal power condition of each antenna, so that Rx, Re, and Rm are within a threshold range. Specifically, for the far field signal and the electric near field signal or the magnetic near field signal, the receive end may feed back measured power to the transmit end, and the transmit end adjusts the transmit signal power based on received signal power that is fed back. The foregoing operations may be performed by using a processing module of an antenna apparatus at the receive end and a processing module of an antenna apparatus at the transmit end.

For the electric near field signal or the magnetic near field signal, due to a coupling effect, the transmit end may directly measure a local current to know received signal power, and adjust transmit signal power Tx, Te, and Tm accordingly.

The foregoing operations may be performed by using the processing module of the antenna apparatus at the transmit end.

A sending/receiving status of an electric near field signal may be analyzed by using a circuit model, which is described hereinafter with reference to FIG. 17. FIG. 7 is a schematic diagram of a circuit model for electric near field communication according to an embodiment of this application. As shown in FIG. 17, signal transmission is implemented between a transmit end and a receive end through capacitive coupling. It is assumed that coupling capacitance is C, receive load resistance is Rr, and a receive load current is Ir; at the transmit end, a transmit signal voltage is V, a transmit signal current is I, resistance from a positive electrode of the transmit end to the ground is Rt1, resistance from a negative electrode of the transmit end to the ground is Rt2, a current from the positive electrode of the transmit end to the ground is Ir1, and a current from the negative electrode of the transmit end to the ground is Ir2. In this case, $Vr=Ir*Rr$, $It1*Rt1=Ir*(1/(j\omega C)+Rr)$, and $Ir=It2-It1$, where a signal frequency is $\omega$. By detecting a change of a local current It1, it can be estimated that a change of the capacitance C $(C=1/\{j\omega\}[It1*Rt1/(It2-It1)]-Rr\})$ corresponds to a change of a communication distance, that is, if It1 increases, C decreases, which means that the distance increases. In this case, power coupled to the receive end decreases.

In an initial situation, the receive end does not provide a feedback at the beginning. Therefore, the transmit end may not know the load resistance Rr of the receive end. In an embodiment, the receive end may alternatively feed back received energy initially, and the transmit end subsequently determines received power by directly measuring the local current. In another embodiment, the load resistance of the receive end is a standard fixed value. Therefore, the transmit end can determine the received power by directly measuring the local current at the beginning.

A sending/receiving status of a magnetic near field signal may also be analyzed similarly by using a circuit model, which is described hereinafter with reference to FIG. 18. FIG. 18 is a schematic diagram of a circuit model for magnetic near field communication according to an embodiment of this application. As shown in FIG. 18, capacitance, inductance, and resistance of a transmit end are Ct, Lt, and Rt respectively, capacitance, inductance, and resistance of a receive end are Cr, Lr, and Rr respectively, a signal voltage of the transmit end is V, and mutual inductance between the transmit end and the receive endis M. Therefore, according to the circuit diagram shown in FIG. 18, the following can be obtained: $Ir(Rr+j\omega Lr+1/(j\omega Cr))=j\omega MIt$, and $V=It(j\omega Lt+1/(j\omega Ct)+Rt)-j\omega MIr$.

When resonance is satisfied, $j\omega Lr=-1/(j\omega Cr)$, and $j\omega Lt=-1/(j\omega Ct)$. Therefore, the two formulas may be expressed as: $Ir*Rr=j\omega MIt$, and $V=It*Rt-j\omega MIr$. $(\omega M)2=V*Rr/(It2Rt)$ may be obtained.

By detecting a change of a local current It, it can be estimated that a change of mutual inductance M (that is, $M=1/\omega*sqrt[V*Rr/(It2Rt)]$) corresponds to a change of a communication distance, that is, if It increases, M decreases, that is, the distance increases, and energy coupled to the receive end decreases.

The transmit end may not know load resistance Rr of the receive end at the beginning. In an embodiment, the receive end may alternatively feed back received energy at the beginning, and the transmit end subsequently determines received power by directly measuring the local current. In another embodiment, the load resistance of the receive end is a standard fixed value. Therefore, the transmit end can determine the received power by directly measuring the local current at the beginning.

A method for adjusting transmit power may be: increasing power of a transmit-end transmission link corresponding to a transmission link with relatively low received power, or decreasing power of a transmit-end transmission link corresponding to a transmission link with relatively high received power. This is equivalent to enabling each transmission link to be maximized, so that overall transmission efficiency is improved as much as possible.

The foregoing analysis is based on presence of three links (including corresponding transmit antennas and receive antennas): a far field link, an electric near field link, and a magnetic near field link. If there are only two of the links, for example, a far field link and an electric near field link, or a far field link and a magnetic near field link, or an electric near field link and a magnetic near field link, the method is similar, and is not described again for brevity.

Sometimes, one or more links include a plurality of sub-links, for example, a plurality of electric near field transmission links, a plurality of magnetic near field transmission links, and a plurality of far field transmission links shown in FIG. 4 and FIG. 5. A capacity is doubled by using a multiple-input multiple-output technology. In this case, transmit power that needs to be adjusted is total transmit power of the plurality of sub-links.

The processing module of the transmit end may determine, based on differences between data rates and differences between transmit power of various links, whether to disable some links, to achieve better energy efficiency. For example, the transmit power of the far field link is Px, the data rate of the far field link is Dx, the transmit power of the magnetic near field link is Pm, the data rate of the magnetic near field link is Dm, and a total data rate is D=(Dx+Dm). Given specific transmit power, there is one corresponding power. Due to impact of non-linearity of an amplifier and fixed power of some components, power of the link is not always directly proportional to the transmit power, but the transmit power can still be obtained based on the transmit power. It is assumed that the transmit power of the far field link and the transmit power of the magnetic near field link obtained herein are Px' and Pm' respectively. When the data rate of the far field link increases from Dx to Dx', the power of the far field link increases to Px". If the total power is the same, the power of the magnetic near field link decreases to [Pm'-(Px"-Px')]. In this case, the corresponding data rate is Dm', and the total data rate is D'=(Dx'+Dm'). If the data rate of the magnetic near field link increases from Dm to Dm", the power of the magnetic near field link increases to Pm". If the total power is the same, the power of the far field link decreases to [Px'-(Pm"-Pm')]. In this case, the corresponding data rate is Dx", and the total data rate is D"=(Dx"+Dm"). Values of D, D', and D" are compared, and a case with the highest data rate is selected. To be specific, if D' is the largest, the transmit power of the far field link is increased and the transmit power of the magnetic near field link is decreased; if D" is the largest, the transmit power of the far field link is decreased and the transmit power of the magnetic near field link is increased; or if D is the largest, no additional operation is required. In this case, if [Pm'-(Px"-Px')]<0, Pm'-(Px"-Px') can only be set to 0, the magnetic near field link is disabled, the data rate Dm' is equal to 0, and the power Px" of the far field link is equal to Px'+Pm'. In this case, the corresponding data rate D'=Dx' is investigated. Similarly, if [Px'-(Pm"-Pm')]<0, Pm'-(Px"-Px') can only be set to 0, the far field link is disabled, the data rate Dx' is equal to 0, and the power Pm" of the magnetic near field link is equal to Px'+Pm'. In this case, the corresponding data rate D"=Dm' is investigated. D, D', and D" are compared. If D' is the largest, the transmit power of the far field link is increased, and the magnetic near field link is disabled. If D" is the largest, the far field link is disabled, and the transmit power of the magnetic near field link is increased. If D is the largest, no additional operation is required. Generally, there are three cases: a far field link, a magnetic near field link, and an electric near field link. Transmit power and a data rate corresponding to each link are investigated. If transmit power of one link is increased, and transmit power of another link is correspondingly decreased at the same time, and a corresponding data rate is calculated based on the transmit power, and the data rate is increased, such an operation is preferred; otherwise, such an operation is not used. If the transmit power is decreased to 0 or a threshold (generally a power value corresponding to lowest transmit power specified for a transmitter), it means that the link is disabled. A method for calculating a data rate based on power is as follows: A difference between a demodulation threshold of a current data rate and a demodulation threshold of a changed data rate is a difference of a power change. For example, a modulation mode changes from quadrature phase shift keying (QPSK) to quadrature amplitude modulation (QAM). For example, if the demodulation threshold needs to be increased by 6 dB, the transmit power needs to be increased by 6 dB. If the power needs to be increased by 8 dB, the data rate is doubled.

In some embodiments, for electric near field communication or magnetic near field communication, because the transmit end may calculate received power based on the measured local current, when the local current is higher than a threshold, the transmit end determines that near field communication is not suitable, disables the local link, and enables another link, for example, enables the far field link and performs far field communication. In far field communication, the transmit end generally learns received signal power depending on the feedback of the receive end. Therefore, if the received power of the receive end is higher than a threshold, the transmit end determines that near field communication can be used, and may enable the magnetic or electric near field communication link and disable the far field link.

Similar to an existing wireless communications mechanism, the transmit end divides a signal into a plurality of signals and transmits the signals on different types of transmission links. If there are at least two different signals, multiplexing is implemented by using different near field links or far and near field links. If the signals are the same, diversity is implemented by using different near field links or far and near field links. Multiplexing can increase a channel capacity, and diversity improves quality of a received signal.

The foregoing describes a signal transmission process. Energy transmission may also be implemented by using a same hardware architecture. In other words, any one of the foregoing antenna apparatuses or antenna systems may be used to transmit energy. A difference lies in that energy transmission does not take an interference problem into account and does not pursue a higher data rate, but achieves higher energy transmission efficiency. As described above, the transmit end may calculate the power of the receive end based on the feedback of the receive end or based on the current of the transmit end. It is assumed that transmit power consumption of the far field link, the electric near field link, and the magnetic near field link is Px, Pe, and Pm respectively, and that received power is Rx, Re, and Rm respectively. A detection method may be used. Usually, a link with lowest power efficiency is selected to reduce transmit power consumption of the link, and transmit power consumption of a link with highest power efficiency is increased. Herein, power efficiency of the far field link, the electric near field link, and the magnetic near field link is $\eta x = Px/Rx$, $\eta e = Pe/Re$, and $\eta m = Pm/Rm$ respectively. Assuming that $\eta x$ is lowest efficiency, transmit power consumption of the far field link is decreased by $\Delta x$. If $\eta m$ is highest efficiency, transmit power consumption of the magnetic near field link is increased by $\Delta x$. Then the power of the receive end is calculated based on the feedback of the receive end or the local current. Whether total received power increases is investigated. If the total received power increases, power allocation is updated; otherwise, the original power allocation is maintained. Further, if an increase is greater than a threshold, the foregoing process is continued; otherwise, only one power update is performed. Note that the transmit power consumption herein is different from the transmit power. Due to non-linearity of the amplifier and fixed consumption of components, the transmit power consumption is generally not in a linear relationship with the transmit power. When the power allocated to a link is lower than a threshold, transmission of the link may be disabled.

The transmit power consumption may be understood as transmit energy.

The foregoing mainly describes the antenna apparatus. The following describes a method for performing communication by using the foregoing antenna apparatus. Because some methods used when the antenna apparatus works are also described above, some content is omitted for brevity. For the omitted content, refer to the foregoing related content.

FIG. 19 is a schematic flowchart of a communication method according to an embodiment of this application. FIG. 19 mainly describes a communication method for an antenna apparatus at a transmit end. The antenna apparatus at the transmit end may be any one of the foregoing antenna apparatuses. Therefore, any one of the foregoing antenna apparatuses at the transmit end may be used to perform operations in FIG. 19. The following describes the operations in FIG. 19.

1901. Generate a to-be-transmitted signal, and transmit the to-be-transmitted signal to a plurality of transmission links.

Operation 1901 may be performed by using the foregoing processing module of the antenna apparatus at the transmit end.

The to-be-transmitted signal may be understood as a signal that has been processed. For example, as described above, the processing module may be used to perform processing such as encoding and modulation to obtain the to-be-transmitted signal, or perform specific processing to obtain to-be-transmitted energy.

Each transmission link includes a front end and an antenna, that is, an antenna and a matching circuit thereof form a transmission path.

In some embodiments, the plurality of transmission links may include at least one electric near field transmission link and at least one magnetic near field transmission link. In this case, a same signal or different signals may be simultaneously sent from an electric near field and an electromagnetic field. Therefore, a signal or energy transmission capacity is increased, and transmission efficiency can be improved.

Optionally, a signal or energy may be simultaneously sent from the electric near field transmission link and the magnetic near field transmission link at a same frequency (that is, a same transmit frequency).

In some embodiments, when the to-be-transmitted signal is transmitted to the plurality of transmission links, transmit power of the to-be-transmitted signal on the plurality of transmission links may be allocated.

The allocation of transmit power can improve overall transmission efficiency as much as possible. For example, in a scenario suitable for far field communication, less power may be allocated to an electric near field transmission link and a magnetic near field transmission link, and more power is allocated to a far field transmission link. For another example, in a scenario suitable for electric near field communication, more power may be allocated to an electric near field transmission link, and less power is allocated to other transmission links.

It should be further understood that zero power may be allocated to one or more transmission links, that is, no transmit power is allocated to some transmission links. This is equivalent to disabling these transmission links. In an example, the plurality of transmission links include an electric near field transmission link and a magnetic near field transmission link. Allocating zero power to the electric near field transmission link is equivalent to using only the magnetic near field transmission link to transmit a signal or energy. Allocating power only to the electric near field transmission link or allocating power only to the magnetic near field transmission link is equivalent to implementing switching between the electric near field transmission link and the magnetic near field transmission link. If the plurality of transmission links include at least one electric near field transmission link, at least one magnetic near field transmission link, and at least one far field transmission link, during power allocation, only one or two of the transmission links may be selected, and this is equivalent to implementing automatic switching between the transmission links. It should be understood that, in this embodiment of this application, as power is allocated, the switching is performed and changes continuously, and is not hard switching. Therefore, the switching is more flexible and applicable.

In an embodiment, the transmit power may be further adjusted based on received power, so that when an antenna apparatus at a receive end receives the to-be-transmitted signal, a difference of received power on a plurality of transmission links of the antenna apparatus at the receive end is within a preset range. In other words, the transmit power of the transmit end is adjusted, so that the difference of the received power on the transmission links of the receive end is relatively small.

The adjustment of transmit power can improve overall transmission efficiency as much as possible. For example, in a scenario suitable for far field communication, power allocated to the electric near field transmission link and the magnetic near field transmission link may be decreased, or even no power is allocated to the two transmission links, and power allocated to the far field transmission link is increased. For another example, in a scenario suitable for electric near field communication, power allocated to the electric near field transmission link may be increased. Which scenarios are suitable may be learned based on the receiving status. Therefore, adjusting power allocation based on the receiving status can implement switching between the transmission links according to different scenarios, and the switching is more accurate and flexible than hard switching.

In some cases, received power on an electric near field transmission link of the antenna apparatus at the receive end may be obtained based on a current on the electric near field transmission link of the antenna apparatus at the transmit end. In other words, a current may be measured on the electric near field transmission link of the transmit end, so that the received power on the electric near field transmission link of the receive end is calculated.

In an initial situation, the receive end does not provide a feedback at the beginning. Therefore, the transmit end may not know load resistance Rr of the receive end. In an embodiment, the receive end may alternatively feed back received energy at the beginning, and the transmit end subsequently determines the received power by directly measuring the local current. In another embodiment, the load resistance of the receive end is a standard fixed value. Therefore, the transmit end can determine the received power by directly measuring the local current at the beginning.

1902. The plurality of transmission links transmit the to-be-transmitted signal.

In an embodiment, the plurality of transmission links may simultaneously transmit the to-be-transmitted signal at a same transmit frequency.

As described above, the antenna apparatus in this embodiment of this application is further applicable to energy transmission. Therefore, the foregoing communication method may further perform the following operations: generating to-be-transmitted energy, and transmitting the to-be-transmitted energy to the plurality of transmission links; transmitting, by the plurality of transmission links, the to-be-transmitted energy; and adjusting energy allocation of the to-be-transmitted energy of the antenna apparatus at the transmit end on the plurality of transmission links based on a status of receiving the to-be-transmitted energy by the antenna apparatus at the receive end.

Different from signal transmission, energy transmission does not take an interference problem into account and does not pursue a higher data rate, but achieves higher energy transmission efficiency. As described above, the transmit end may calculate the power of the receive end based on the feedback of the receive end or based on the current of the transmit end. It is assumed that transmit power consumption of the far field link, the electric near field link, and the magnetic near field link is Px, Pe, and Pm respectively, and that received power is Rx, Re, and Rm respectively. A detection method may be used. Usually, a link with lowest power efficiency is selected to reduce transmit power consumption of the link, and transmit power consumption of a link with highest power efficiency is increased. Herein, power efficiency of the far field link, the electric near field link, and the magnetic near field link is $\eta x=Px/Rx$, $\eta e=Pe/Re$, and $\eta m=Pm/Rm$ respectively. Assuming that $\eta x$ is lowest efficiency, transmit power consumption of the far field link is decreased by $\Delta x$. If $\eta m$ is highest efficiency, transmit power consumption of the magnetic near field link is increased by $\Delta x$. Then the power of the receive end is calculated based on the feedback of the receive end or the local current. Whether total received power increases is investigated. If the total received power increases, power allocation is updated; otherwise, the original power allocation is maintained. Further, if an increase is greater than a threshold, the foregoing process is continued; otherwise, only one power update is performed. Note that the transmit power consumption herein is different from the transmit power Due to non-linearity of an amplifier and fixed consumption of components, the transmit power consumption is generally not in a linear relationship with the transmit power. When the power allocated to a link is lower than a threshold, transmission of the link may be disabled.

Figure 20:
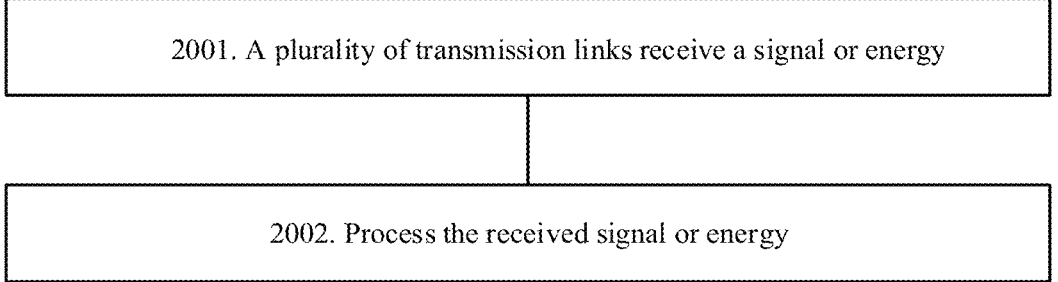
FIG. 20 is a schematic flowchart of a communication method according to an embodiment of this application.

FIG. 20 is a schematic flowchart of a communication method according to an embodiment of this application. FIG. 20 mainly describes a communication method for an antenna apparatus at a receive end. The antenna apparatus at the receive end may be any one of the foregoing antenna apparatuses. Therefore, any one of the foregoing antenna apparatuses at the receive end may be used to perform operations in FIG. 20. The following describes the operations in FIG. 20.

2001. A plurality of transmission links receive a signal or energy.

For descriptions of the plurality of transmission links, refer to related content in FIG. 19. Details are not described again.

2002. Process the received signal or energy.

A processing module may be used to perform combination processing on received signals or energy, and may further perform processing such as decoding, demodulation, and descrambling.

In some embodiments, the received power of the signal or energy on the plurality of transmission links may be further fed back to the antenna apparatus at the transmit end, so that the antenna apparatus at the transmit end can adjust power or energy allocation of the antenna apparatus based on the feedback.

A person of ordinary skill in the art may be aware that units and operations in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division of units is merely logical function division and may be other division in actual implementation. For example, a plurality of units or components may be combined or integrated into another system, or some features may be ignored or may not be performed. In addition, the displayed or discussed mutual couplings or direct couplings or communications connections may be implemented by using some interfaces. The indirect couplings or communications connections between apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement, to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as a separate product, the functions may be stored in a computer-readable storage medium. Based on such an understanding, the technical solutions of this application essentially or parts contributing to the prior art or some of the technical solutions may be embodied in a form of a software product. The computer software product is stored in a storage medium, and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna apparatus, applied to a transmit end and comprising:

a processing module, configured to generate a signal to be transmitted; and a plurality of transmission links, configured to receive the signal from the processing module and to transmit the signal, wherein the plurality of transmission links comprise one or more electric near field transmission links and one or more magnetic near field transmission links, each of the one or more electric near field transmission links comprise an electric near field front end and an electric near field antenna, the electric near field front end is configured to transmit the signal to the electric near field antenna, each of the one or more magnetic near field transmission links comprise a magnetic near field front end and a magnetic near field antenna, the magnetic near field front end is configured to transmit the signal to the magnetic near field antenna, and the electric near field antenna and the magnetic near field antenna are configured to transmit the signal, wherein at least one of the one or more electric near field transmission links and at least one of the one or more magnetic near field transmission links are mutually independent.

2. The antenna apparatus according to claim 1, wherein the plurality of transmission links are configured to simultaneously transmit the signal at a same transmit frequency.

3. The antenna apparatus according to claim 1, wherein the processing module is further configured to allocate transmit power of the signal on the plurality of transmission links.

4. The antenna apparatus according to claim 3, wherein the processing module is further configured to adjust the transmit power, so that when an antenna apparatus at a receive end receives the signal, a difference of received power on a plurality of transmission links of the antenna apparatus at the receive end is within a preset range.

5. The antenna apparatus according to claim 4, wherein the received power is obtained based on currents on the plurality of transmission links at the transmit end; or the received power is fed back by the antenna apparatus at the receive end to the transmit end.

6. The antenna apparatus according to claim 1, wherein the electric near field front end comprises a voltage amplifier, and the voltage amplifier is configured to increase a transmit voltage of the electric near field antenna.

7. The antenna apparatus according to claim 1, further comprising a far field transmission link that comprises a far field front end and a far field antenna, wherein the far field front end is configured to transmit the signal to the far field antenna, and the far field antenna is configured to transmit the signal.

8. The antenna apparatus according to claim 7, wherein any plurality of antennas of the electric near field antenna, the magnetic near field antenna, and the far field antenna are integrated.

9. The antenna apparatus according to claim 1, wherein the processing module is further configured to generate energy to be transmitted, and transmit the energy to the plurality of transmission links;

the plurality of transmission links are further configured to transmit the energy; and the processing module is further configured to adjust energy allocation of the energy on the plurality of transmission links based on a status of receiving the energy by the antenna apparatus at a receive end.

10. An antenna apparatus, applied to a receiving end and comprising:

a processing module; and a plurality of transmission links, configured to receive a signal or energy, wherein the plurality of transmission links comprise one or more electric near field transmission links and one or more magnetic near field transmission links, each of the one or more electric near field transmission links comprise an electric near field front end and an electric near field antenna, each of the one or more magnetic near field transmission links comprise a magnetic near field front end and a magnetic near field antenna, the electric near field antenna and the magnetic near field antenna are configured to receive the signal or the energy, the electric near field front end is configured to transmit the signal or the energy received by the electric near field antenna to the processing module, and the magnetic near field front end is configured to transmit the signal or the energy received by the magnetic near field antenna to the processing module, wherein at least one of the one or more electric near field transmission links and at least one of the one or more magnetic near field transmission links are mutually independent, and wherein the processing module is configured to process the signal or the energy.

11. The antenna apparatus according to claim 10, wherein the processing module is further configured to feed back, to an antenna apparatus at a transmit end, received power of the signal received on the plurality of transmission links, and/or configured to feed back, to the antenna apparatus at the transmit end, a status of receiving the energy on the plurality of transmission links.

12. The antenna apparatus according to claim 10, further comprising a far field transmission link that comprises a far field front end and a far field antenna, wherein the far field antenna is configured to receive the signal or the energy, and the far field front end is configured to transmit the signal or the energy received by the far field antenna to the processing module.

13. A communication method, comprising:

generating a signal to be transmitted, and transmitting the signal to a plurality of transmission links; and transmitting, by the plurality of transmission links, the signal, wherein the plurality of transmission links comprise one or more electric near field transmission links and one or more magnetic near field transmission links, each of the one or more electric near field transmission links comprise an electric near field front end and an electric near field antenna, the electric near field front end is configured to transmit the signal to the electric near field antenna, each of the one or more magnetic near field transmission links comprise a magnetic near field front end and a magnetic near field antenna, the magnetic near field front end is configured to transmit the signal to the magnetic near field antenna, and the electric near field antenna and the magnetic near field antenna are configured to transmit the signal, wherein at least one of the one or more electric near field transmission links and at least one of the one or more magnetic near field transmission links are mutually independent.

14. The communication method according to claim 13, wherein the transmitting, by the plurality of transmission links, the signal comprises:

simultaneously transmitting, by the plurality of transmission links, the signal at a same transmit frequency.

15. The communication method according to claim 13, wherein the transmitting the signal to a plurality of transmission links comprises:

allocating transmit power of the signal on the plurality of transmission links.

16. The communication method according to claim 15, further comprising:

adjusting the transmit power, so that when an antenna apparatus at a receive end receives the signal, a difference of received power on a plurality of transmission links of the antenna apparatus at the receive end is within a preset range.

17. The communication method according to claim 16, wherein the received power is obtained based on currents on the plurality of transmission links at a transmit end; or the received power is fed back by the antenna apparatus at the receive end to the transmit end.

18. The communication method according to claim 17, further comprising:

generating energy to be transmitted, and transmitting the energy to the plurality of transmission links;

transmitting, by the plurality of transmission links, the energy; and adjusting energy allocation of the energy of the antenna apparatus at the transmit end on the plurality of transmission links based on a status of receiving the energy by the antenna apparatus at the receive end.

19. A communication method, comprising:

receiving, by a plurality of transmission links, a signal or energy, wherein the plurality of transmission links comprise one or more electric near field transmission links and one or more magnetic near field transmission links, each of the one or more electric near field transmission links comprise an electric near field front end and an electric near field antenna, each of the one or more magnetic near field transmission links comprise a magnetic near field front end and a magnetic near field antenna, the electric near field antenna and the magnetic near field antenna are configured to receive the signal or the energy, the electric near field front end is configured to transmit the signal or the energy received by the electric near field antenna to a processing module, and the magnetic near field front end is configured to transmit the signal or the energy received by the magnetic near field antenna to the processing module, wherein at least one of the one or more electric near field transmission links and at least one of the one or more magnetic near field transmission links are mutually independent; and processing the signal or the energy.

20. The communication method according to claim 19, wherein the method further comprises: feeding back, to an antenna apparatus at a transmit end, received power of the signal received on the plurality of transmission links, and/or feeding back, to the antenna apparatus at the transmit end, a status of receiving the energy on the plurality of transmission links.

* * * * *